(12) United States Patent
Sakurai et al.

(10) Patent No.: US 11,029,567 B2
(45) Date of Patent: Jun. 8, 2021

(54) LIQUID CRYSTAL PANEL HAVING AN ELECTRODE WITH A BENT PORTION

(71) Applicant: Japan Display Inc., Tokyo (JP)

(72) Inventors: Yoshihiro Sakurai, Kanagawa (JP); Hironao Tanaka, Kanagawa (JP); Harumi Okuno, Kanagawa (JP); Takeo Koito, Kanagawa (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/429,639

(22) Filed: Jun. 3, 2019

(65) Prior Publication Data

US 2019/0293977 A1    Sep. 26, 2019

Related U.S. Application Data

(60) Continuation of application No. 15/955,042, filed on Apr. 17, 2018, now Pat. No. 10,310,331, which is a
(Continued)

(30) Foreign Application Priority Data

Dec. 19, 2008   (JP) ................................ 2008-324781

(51) Int. Cl.
    *G02F 1/1337* (2006.01)
    *G02F 1/1343* (2006.01)
(52) U.S. Cl.
    CPC ...... *G02F 1/1337* (2013.01); *G02F 1/133707* (2013.01); *G02F 1/134363* (2013.01); *G02F 1/134372* (2021.01); *G02F 1/133749* (2021.01)
(58) Field of Classification Search
    CPC combination set(s) only.
    See application file for complete search history.

(56) References Cited

U.S. PATENT DOCUMENTS

2002/0008799 A1    1/2002  Ota
2003/0043327 A1    3/2003  Aoyama et al.
(Continued)

FOREIGN PATENT DOCUMENTS

JP      08-114781      5/1996
JP      10-090682      4/1998
(Continued)

OTHER PUBLICATIONS

Japanese Office Action dated Nov. 27, 2012 in corresponding Japanese Application No. 2011-124020.
(Continued)

*Primary Examiner* — Lauren Nguyen
(74) *Attorney, Agent, or Firm* — K&L Gates LLP

(57) ABSTRACT

A liquid crystal panel includes pixels arranged in first and second directions and having a pixel region and including: first and second electrodes; and an alignment film having an alignment direction, wherein the first electrode has: a plurality of electrode branches each having first and second ends in the first direction; a slit between adjacent two branches; a first connection connecting the first ends; a second connection connecting the second ends; and a contact hole adjacent to second connection, wherein the first electrode has areas including: a main portion; and a bent portion that is adjacent to the contact hole and that includes the second end, the bent portion being bent relative to main portion at an angle not less than 7 degrees with respect to alignment direction, wherein an area ratio of the bent portion relative to entire area of the pixel region is not more than 50%.

15 Claims, 30 Drawing Sheets

Related U.S. Application Data continuation of application No. 14/263,586, filed on Apr. 28, 2014, now Pat. No. 9,977,287, which is a division of application No. 12/640,906, filed on Dec. 17, 2009, now abandoned.

(56) References Cited

U.S. PATENT DOCUMENTS

| | | |
|---|---|---|
| 2007/0216841 A1 | 9/2007 | Konno |
| 2007/0229742 A1 | 10/2007 | Kobayashi et al. |
| 2008/0074602 A1* | 3/2008 | Arai .................. G02F 1/134363 349/146 |
| 2008/0100787 A1* | 5/2008 | Segawa ............. G02F 1/134363 349/141 |
| 2008/0143939 A1 | 6/2008 | Adachi et al. |
| 2008/0204648 A1 | 8/2008 | Tanaka et al. |
| 2009/0128727 A1 | 5/2009 | Yata |
| 2010/0079712 A1* | 4/2010 | Tanaka .............. G02F 1/134363 349/123 |

FOREIGN PATENT DOCUMENTS

| | | |
|---|---|---|
| JP | 10-123482 | 5/1998 |
| JP | 11-202356 | 7/1999 |
| JP | 2000-056336 | 2/2000 |
| JP | 2000-305096 | 11/2000 |
| JP | 2000-330123 | 11/2000 |
| JP | 2001-033824 | 2/2001 |
| JP | 2001-305567 | 10/2001 |
| JP | 2003-195330 | 7/2003 |
| JP | 2003-307741 | 10/2003 |
| JP | 2004-053828 | 2/2004 |
| JP | 2005-107535 | 4/2005 |
| JP | 2005-196162 | 7/2005 |
| JP | 2007-248557 | 9/2007 |
| JP | 2007-334317 | 12/2007 |
| JP | 2008-083386 | 4/2008 |
| JP | 2008-151817 | 7/2008 |
| KR | 10-2004-0107648 | 12/2004 |
| KR | 10-2007-0000584 | 1/2007 |
| KR | 10-2008-0028818 | 4/2008 |

OTHER PUBLICATIONS

Japanese Office Action dated Oct. 21, 2014 in corresponding Japanese Application No. 2013-248574.
Korean Office Action dated Mar. 22, 2016 in corresponding Korean Application No. 10-2009-0119064.

* cited by examiner

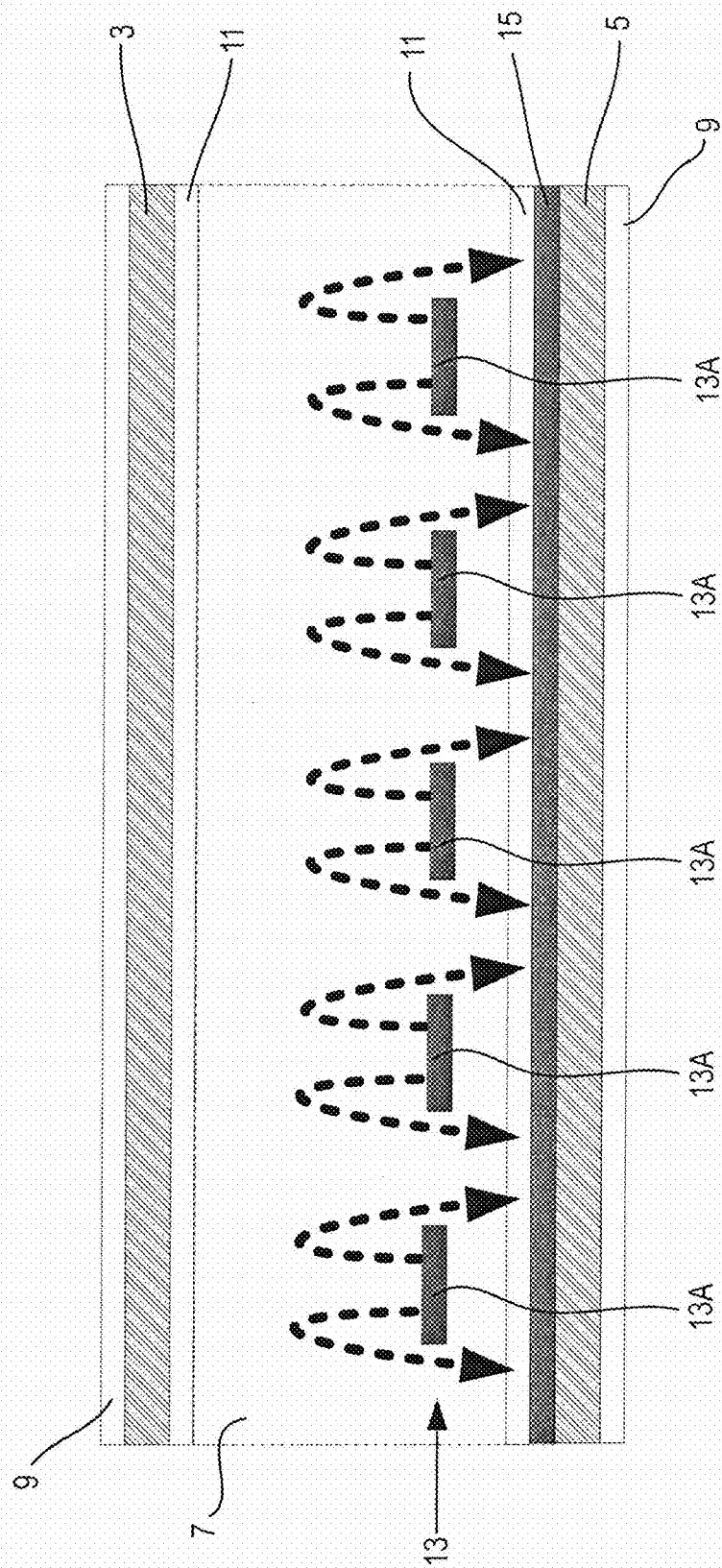

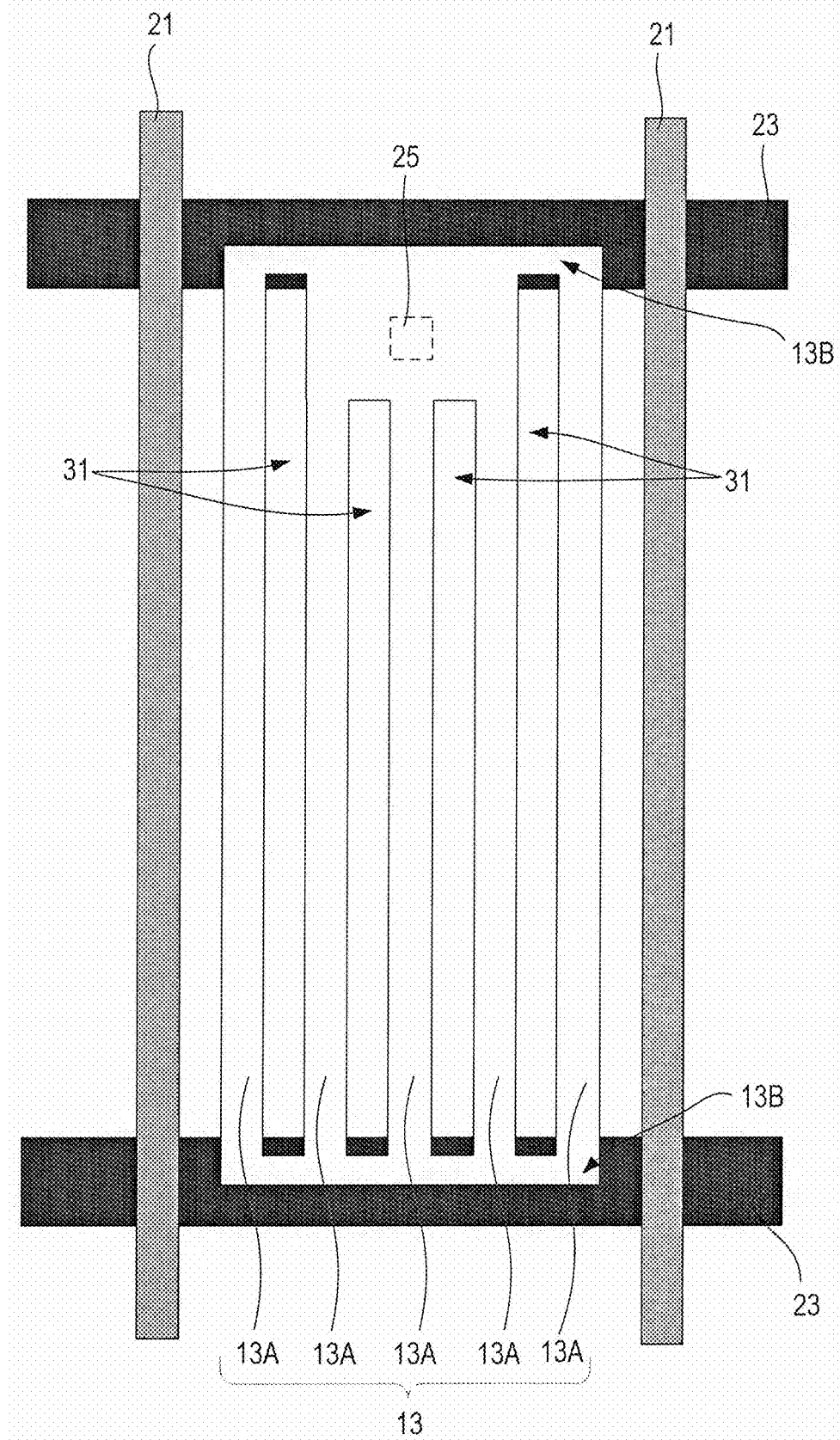

LIQUID CRYSTAL PANEL HAVING AN ELECTRODE WITH A BENT PORTION

CROSS REFERENCES TO RELATED APPLICATIONS

The present application is a continuation application of U.S. patent application Ser. No. 15/955,042, filed on Apr. 17, 2018, which application is a continuation application of U.S. patent application Ser. No. 14/263,586, filed on Apr. 28, 2014, issued as U.S. Pat. No. 9,977,287 on May 22, 2018, which application is a divisional application of U.S. patent application Ser. No. 12/640,906, filed Dec. 17, 2009, which application claims priority to Japanese Priority Patent Application JP 2008-324781 filed in the Japan Patent Office on Dec. 19, 2008, the entire contents of which is hereby incorporated by reference.

BACKGROUND

The present application relates to a transverse electric field driving liquid crystal panel which performs rotation control of the arrangement of liquid crystal molecules in parallel to a substrate surface by a transverse electric field generated between a pixel electrode and a counter electrode. The present application also relates to an electronic apparatus having the liquid crystal panel mounted therein.

DESCRIPTION OF THE RELATED ART

At present, liquid crystal panels have various panel structures including a vertical electric field display type in which an electric field is generated in the vertical direction with respect to the panel surface. For example, a transverse electric field display type panel structure is suggested in which an electric field is generated in the horizontal direction with respect to the panel surface.

In the transverse electric field display type liquid crystal panel, the rotation direction of liquid crystal molecules is parallel to the substrate surface. That is, in the transverse electric field display type liquid crystal panel, there is little rotation of the liquid crystal molecules in the vertical direction with respect to the substrate surface. For this reason, changes in the optical characteristics (contrast, luminance, and color tone) are comparatively small. That is, the transverse electric field display type liquid crystal panel has a wider viewing angle than the vertical electric field display type liquid crystal panel.

FIG. 1 shows an example of the sectional structure of a pixel region constituting a transverse electric field display type liquid crystal panel. FIG. 2 shows an example of the corresponding planar structure.

A liquid crystal panel 1 has two glass substrates 3 and 5, and a liquid crystal layer 7 filled so as to be sandwiched with the glass substrates 3 and 5. A polarizing plate 9 is disposed on the outer surface of each substrate, and an alignment film 11 is disposed on the inner surface of each substrate. Note that the alignment film 11 is used to arrange a group of liquid crystal molecules of the liquid crystal layer 7 in a predetermined direction. In general, a polyimide film is used.

On the glass substrate 5, a pixel electrode 13 and a counter electrode 15 are formed of a transparent conductive film. Of these, the pixel electrode 13 is structured such that both ends of five comb-shaped electrode branches 13A are respectively connected by connection portions 13B. Meanwhile, the counter electrode 15 is formed below the electrode branches 13A (near the glass substrate 5) so as to cover the entire pixel region. This electrode structure causes a parabolic electric field between the electrode branches 13A and the counter electrode 15. In FIG. 1, this electric field is indicated by a broken-line arrow.

The pixel region corresponds to a region surrounded by signal lines 21 and scanning lines 23 shown in FIG. 2. In each pixel region, a thin film transistor for controlling the application of a signal potential to the pixel electrode 13 is disposed. The gate electrode of the thin film transistor is connected to a scanning line 23, so the thin film transistor is turned on/off by the potential of the scanning line 23.

One main electrode of the thin film transistor is connected to a signal line 21 through an interconnect pattern (not shown), and the other main electrode of the thin film transistor is connected to a contact 25 of the pixel electrode. Thus, when the thin film transistor is turned on, the signal line 21 and the pixel electrode 13 are connected to each other, and the signal potential is applied to the pixel electrode 13.

As shown in FIG. 2, in this specification, a gap between the electrode branches 13A is called a slit 31. In FIG. 2, the extension direction of the slit 31 is identical to the extension direction of the signal line 21.

For reference, FIGS. 3A and 3B show the sectional structure around the contact 25.

JP-A-10-123482 and JP-A-11-202356 are examples of the related art.

SUMMARY

In the transverse electric field display type liquid crystal panel, it is known that, as shown in FIG. 4, the alignment of the liquid crystal molecules is likely to be disturbed at both ends of the slit 31 (around the connection portion of the electrode branches 13A and the connection portion 13B). This phenomenon is called disclination. In FIG. 4, regions 41 where the arrangement of the liquid crystal molecules is disturbed due to occurrence of disclination are shaded. In FIG. 4, the alignment of the liquid crystal molecules is disturbed at ten regions 41 in total.

If external pressure (finger press or the like) is applied to the disclination, the disturbance of the arrangement of the liquid crystal molecules is expanded along the extension direction of the electrode branches 13A. Further, the disclination expanded from the upper portion of the pixel and the disclination expanded from the lower portion of the pixel are linked at the center of the pixel, and the shape is maintained. Note that the liquid crystal molecules in the disclination rotate in a direction opposite to the direction determined according to the electric field direction. This phenomenon is called a reverse twist phenomenon.

FIG. 5 shows an example of the occurrence of a reverse twist phenomenon. In FIG. 5, regions 43 where the arrangement of the liquid crystal molecules is disturbed are shaded. These regions extend along the extension direction of the electrode branches 13A.

In the case of the liquid crystal panel being used at present, if the reverse twist phenomenon occurs, the original state is not restored after it has been left uncontrolled. This is because the disclination expanded from the upper portion of the pixel is linked with the disclination expanded from the lower portion of the pixel at the central portion of the pixel to form a stabilized state, and the alignment direction of the liquid crystal molecules in the regions 43 is not restored to the original state. As a result, the regions 43 where the reverse twist phenomenon occurs may be continuously viewed as residual images (that is, display irregularity). Hereinafter, a residual image is called a reverse twist line.

An embodiment of the application provides a liquid crystal panel. The liquid crystal panel includes first and second substrates arranged to be opposite each other at a predetermined gap, a liquid crystal layer filled between the first and second substrates, alignment films, a counter electrode pattern formed on the first substrate, and a pixel electrode pattern formed on the first substrate so as to have a plurality of electrode branches, the extension direction of which is bent at one bend point provided near an upper pixel portion from the center of a pixel region, and which are connected at the end portion of at least the upper pixel portion.

The extension direction of a slit formed near the upper pixel portion from the bend point from among slits formed in the pixel electrode pattern may cross the alignment direction of the liquid crystal layer at an angle of 7° or larger. With this configuration, alignment disturbance which occurs in the vicinity of the upper pixel portion can be suppressed.

The extension direction of a slit formed on the side opposite to the upper pixel portion from the bend point may cross the alignment direction of the liquid crystal layer at an angle of 7° or larger. With this configuration, even though a reverse twist line grows beyond a bent region and reaches the center of the screen, alignment disturbance can rapidly disappear.

The cross angle between the extension direction of the slit and the alignment direction of the liquid crystal layer may be equal to or larger than 7° and equal to or smaller than 15°. This is because as the cross angle is larger, the alignment stability during voltage application increases, and as the cross angle is larger, transmittance is lowered.

The pixel electrode pattern and the counter electrode pattern may be formed on the same layer surface, or may be formed on different layer surfaces. That is, if the liquid crystal panel is a transverse electric field display type liquid crystal panel, and the pixel electrode has a slit, the sectional structure of the pixel region is not limited.

A plurality of bend points may be provided in the pixel electrode pattern. For example, when two bend points are provided, a second bend point may be provided around a connection portion in a lower pixel portion. This is because disclination occurs in an end portion of the lower pixel portion.

When three bend points are provided, a third bend point may be provided around the center of the pixel region. If the third bend point is provided, the pixel region can be divided into two regions, and a viewing angle can be widened.

When five bend points are provided, fourth and fifth bend points may be provided around both sides of the third bend point. In this case, if the cross angle between the extension direction of a slit formed between the fourth and fifth bend points on both sides of the third bend point and the alignment direction of the liquid crystal layer is larger than 7°, the alignment stability around the center of the pixel region during voltage application pixel region can be increased.

The inventors have focused on the slit end portion where disclination occurs. From this viewpoint, the pixel electrode pattern or the alignment film is formed such that cross angle between the slit extension direction around the relevant region and the alignment direction of the liquid crystal layer is equal to or larger than 7°.

With this pixel structure, the alignment stability in the slit end portion can be intensively increased.

Additional features and advantages are described herein, and will be apparent from the following Detailed Description and the figures.

BRIEF DESCRIPTION OF THE FIGURES

FIG. 1 is a diagram illustrating an example of the sectional structure of a transverse electric field display type liquid crystal panel.

FIG. 2 is a diagram illustrating an example of the planar structure of a transverse electric field display type liquid crystal panel.

DETAILED DESCRIPTION

The present application will be described below with reference to the figures accordingly to an embodiment.

(A) Appearance Example of Liquid Crystal Panel Module and Panel Structure (B) Characteristics Found between Extension Direction of Slit and Alignment Direction of Liquid Crystal Layer (C) Pixel Structure Example 1 (Single Domain Structure Example with One Bend Point)

(D) Pixel Structure Example 2 (Single Domain Structure Example with One Bend Point)

(E) Pixel Structure Example 3 (Single Domain Structure Example with Two Bend Points)

(F) Pixel Structure Example 4 (Dual Domain Structure Example with Three Bend Points)

(G) Pixel Structure Example 5 (Dual Domain Structure Example with Three Bend Points)

(H) Pixel Structure Example 6 (Dual Domain Structure Example with Five Bend Points)

(I) Pixel Structure Example 7 (Dual Domain Structure Example with Five Bend Points)

(J) Pixel Structure Example 8 (Modification)

(K) Pixel Structure Example 9 (Modification)

(L) Pixel Structure Example 10 (Modification)

(M) Other Examples

Elements which are not provided with particular drawings or descriptions herein are realized by existing techniques in the relevant technical field. Embodiments described below are exemplary, and not limiting to the present application.

(A) Appearance Example of Liquid Crystal Panel Module and Panel Structure

Figure 3A:
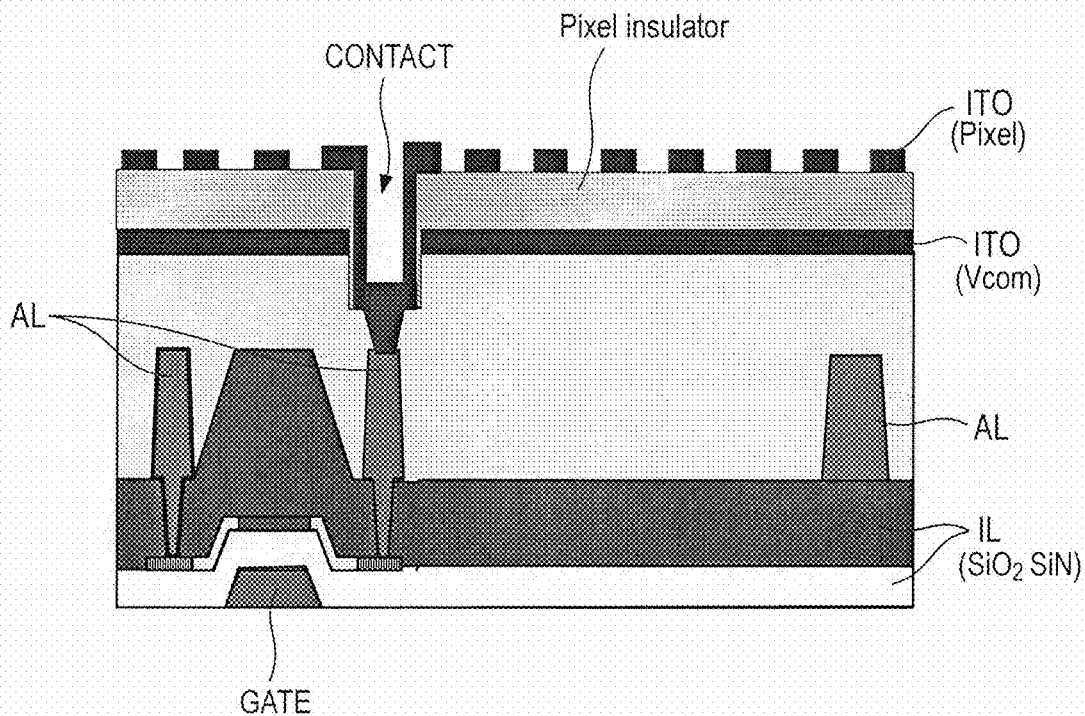
FIGS. 3A and 3B are diagrams showing an example of the sectional structure around a contact.
Figure 3B:
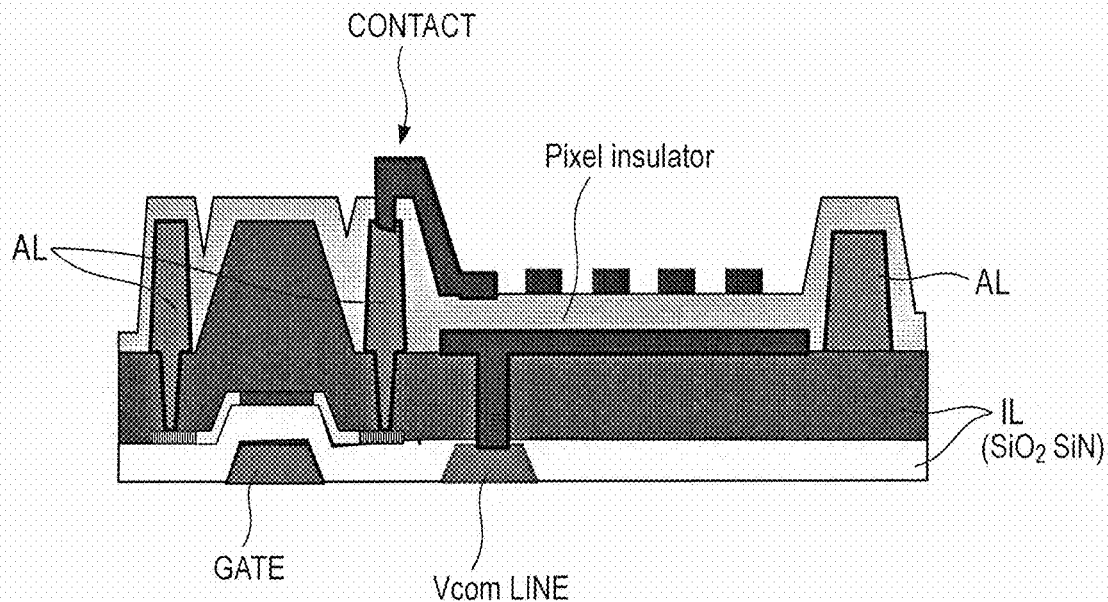
Figure 4:
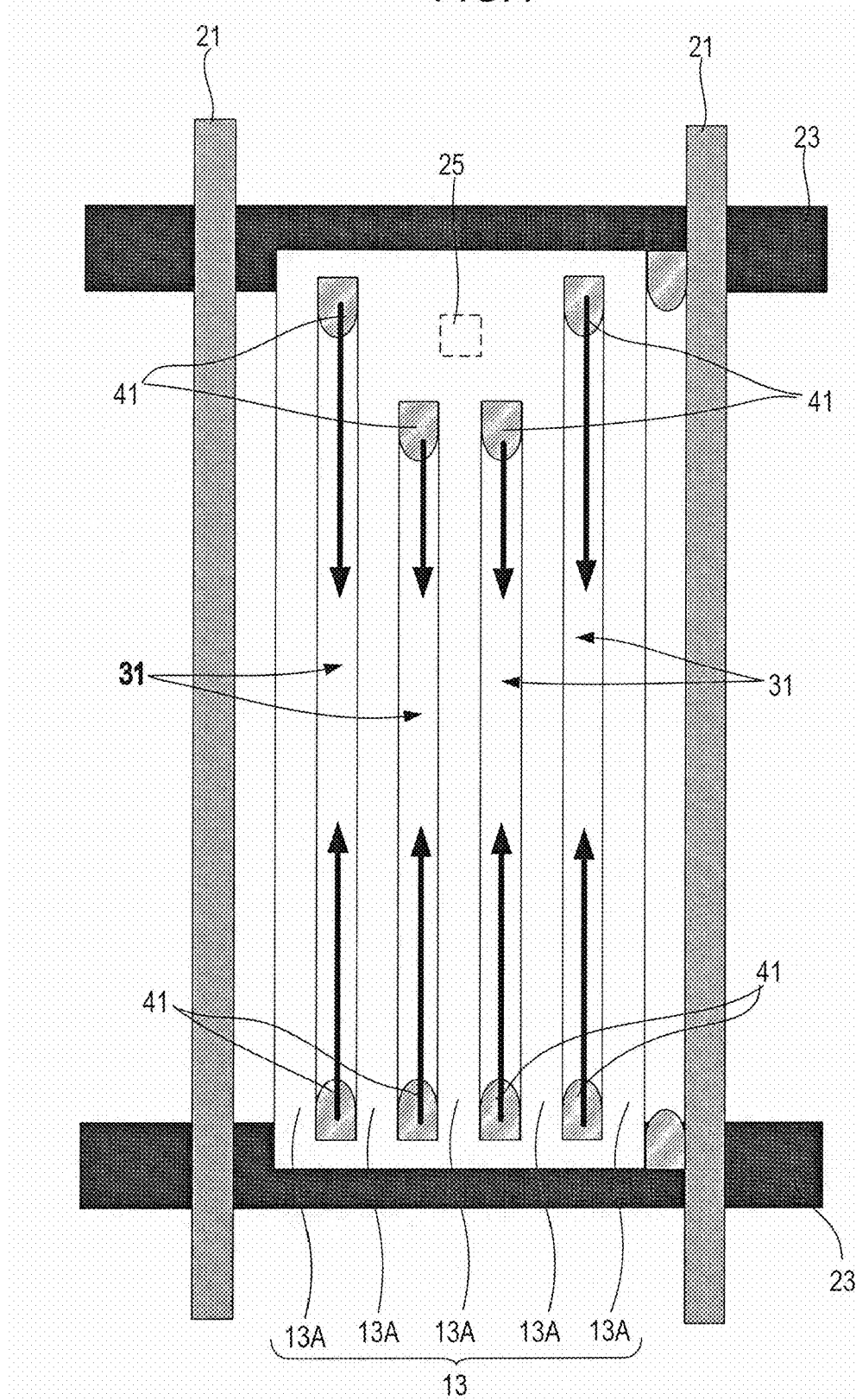
FIG. 4 is a diagram illustrating disclination.
Figure 5:
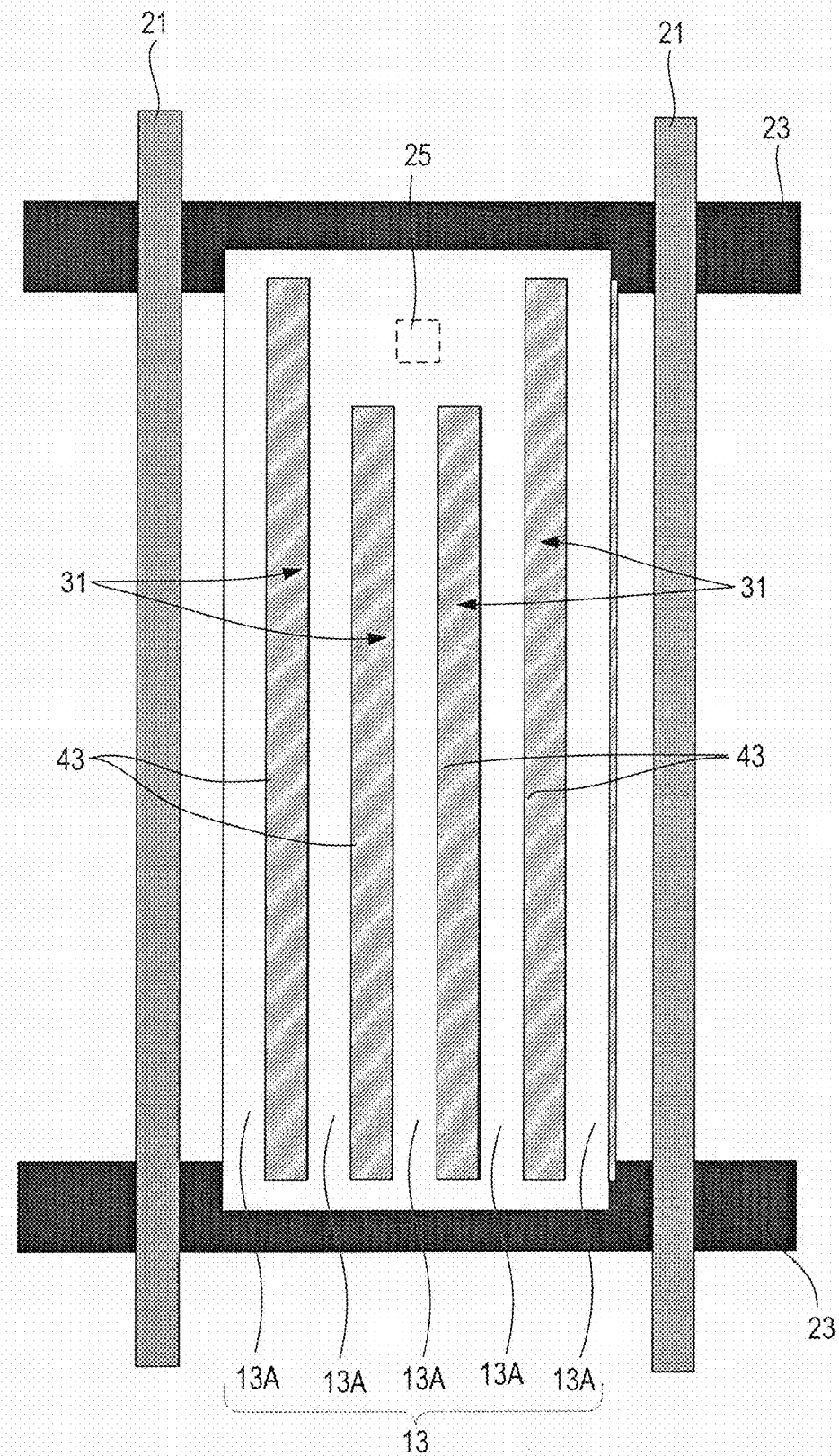
FIG. 5 is a diagram illustrating a reverse twist phenomenon.
Figure 6:
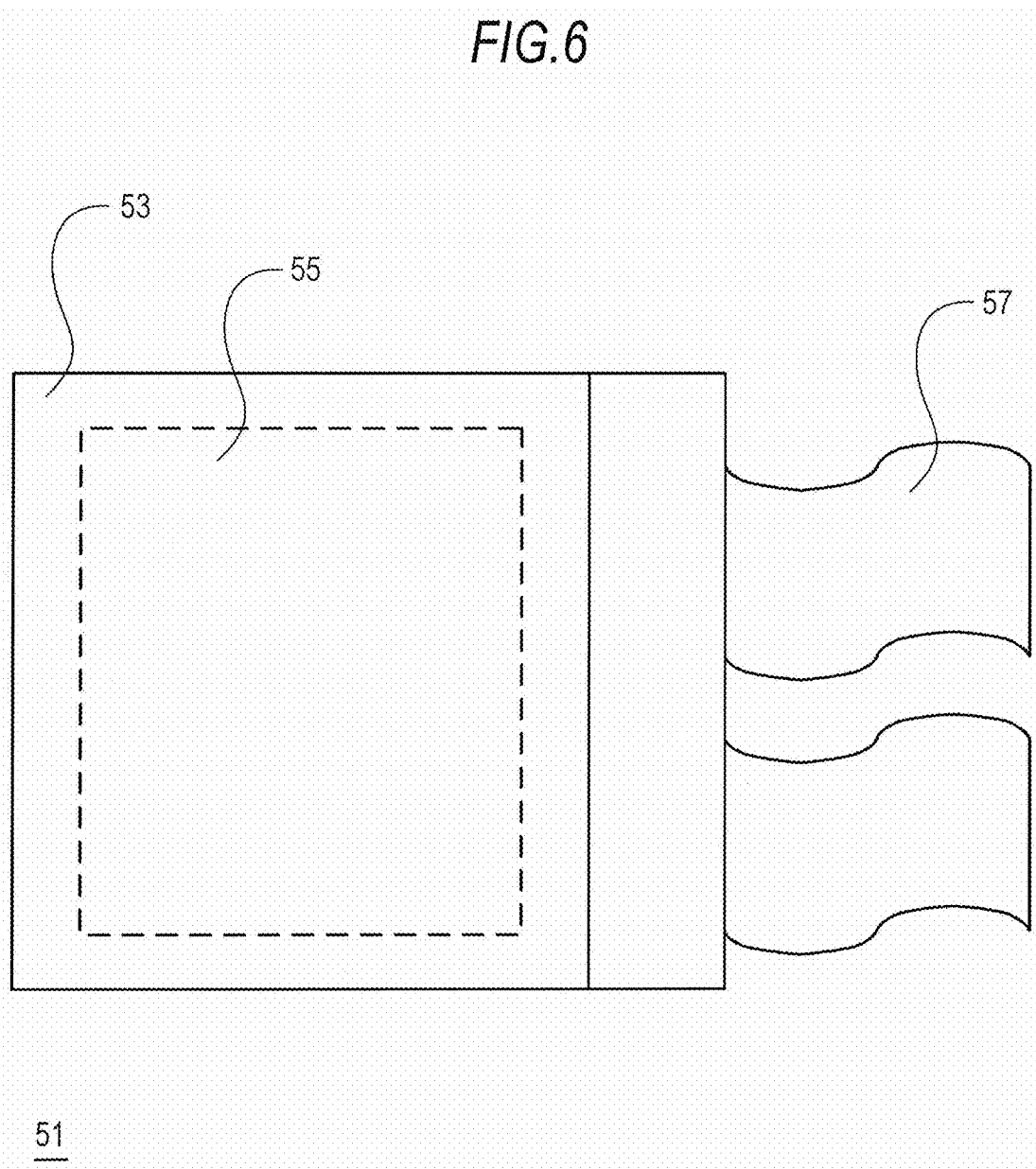
FIG. 6 is a diagram showing an appearance example of a liquid crystal panel module.

FIG. 6 shows an appearance example of a liquid crystal panel module 51. The liquid crystal panel module 51 is structured such that a counter substrate 55 is bonded to a support substrate 53. The support substrate 53 is made of glass, plastic, or other substrates. The counter substrate 55 is also made of glass, plastic, or other transparent substrates. The counter substrate 55 is a member which seals the surface of the support substrate 53 with a sealant interposed therebetween.

Note that only one substrate on the light emission side may be a transparent substrate, and the other substrate may be a nontransparent substrate.

The liquid crystal panel 51 is provided with an FPC (Flexible Printed Circuit) 57 for inputting an external signal or driving power, if necessary.

Figure 7:
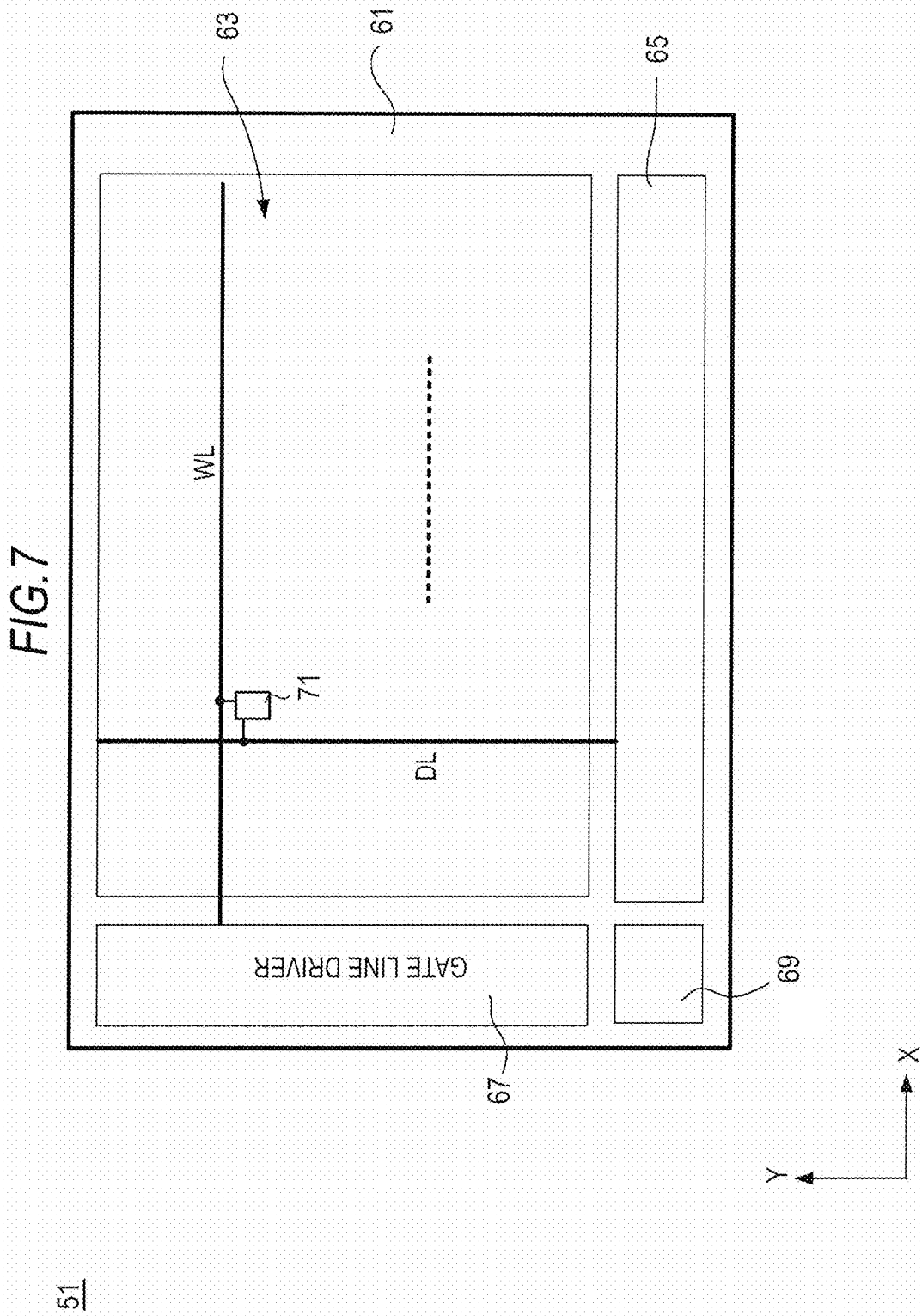
FIG. 7 is a diagram showing an example of the system configuration of a liquid crystal panel module.

FIG. 7 shows an example of the system configuration of the liquid crystal panel module 51. The liquid crystal panel module 51 is configured such that a pixel array section 63, a signal line driver 65, a gate line driver 67, and a timing controller 69 are disposed on a lower glass substrate 61 (corresponding to the glass substrate 5 of FIG. 1). In this embodiment, the driving circuit of the pixel array section 63 is formed as a single or a plurality of semiconductor integrated circuits, and is mounted on the glass substrate.

The pixel array section 63 has a matrix structure in which white units each constituting one pixel for display are arranged in M rows×N columns. In this specification, the row refers to a pixel row of 3×N subpixels 71 arranged in the X direction of the drawing. The column refers to a pixel column of M subpixels 71 arranged in the Y direction of the drawing. Of course, the values M and N are determined depending on the display resolution in the vertical direction and the display resolution in the horizontal direction.

The signal line driver 65 is used to apply a signal potential Vsig corresponding to a pixel gradation value to signal lines DL. In this embodiment, the signal lines DL are arranged so as to extend in the Y direction of the drawing.

The gate line driver 67 is used to apply control pulses for providing the write timing of the signal potential Vsig to scanning lines WL. In this embodiment, the scanning lines WL are arranged so as to extend in the X direction of the drawing.

A thin film transistor (not shown) is formed in each subpixel 71. The thin film transistor has a gate electrode connected to a corresponding one of the scanning lines WL, one main electrode connected to a corresponding one of the signal lines DL, and the other main electrode connected to the pixel electrode 13 (contact 25).

The timing controller 69 is a circuit device which supplies driving pulses to the signal line driver 65 and the gate line driver 67.

(B) Characteristics Found Between Extension Direction of Slit and Alignment Direction of Liquid Crystal Layer As described above, in the existing pixel structure, if disturbance (reverse twist phenomenon) of the alignment of liquid crystal molecules occurs due to finger press or the like, the disturbance is continuously viewed as display irregularity.

Accordingly, the inventors have experimented on whether the disturbance of the alignment of liquid crystal molecules can be reduced or not by itself by changing the cross angle between the extension direction of each slit 31 formed by the electrode branches 13A of the pixel electrode 13 and the alignment direction of the liquid crystal layer 7. The alignment direction of the liquid crystal layer 7 (also referred to as "alignment direction of liquid crystal") is defined by the orientation of dielectric anisotropy of liquid crystal, and refers to a direction with a large dielectric constant.

Hereinafter, the characteristics which become clear experimentally will be described.

Figure 8:
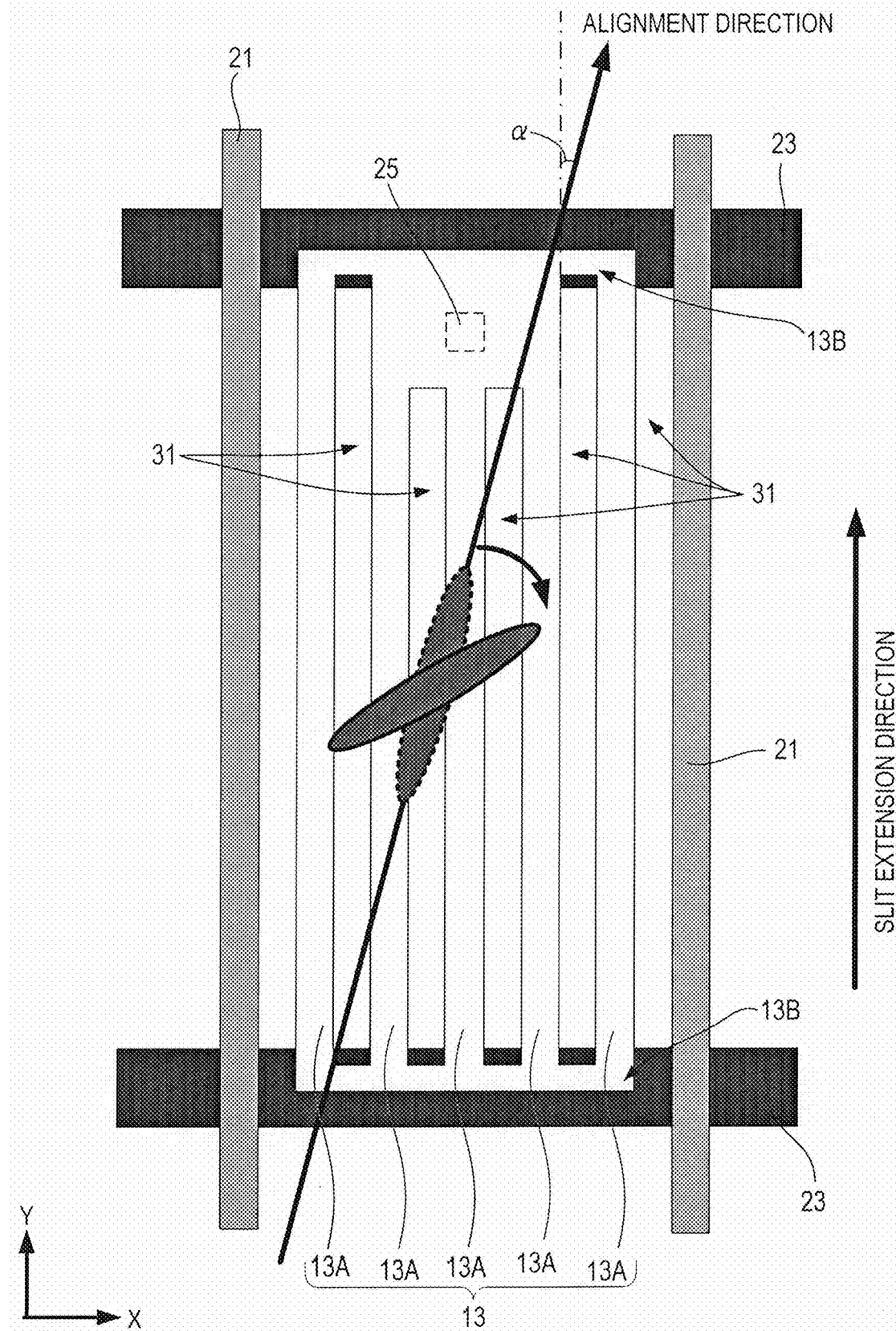
FIG. 8 is a diagram illustrating the cross angle between the extension direction of each slit and the alignment direction of a liquid crystal layer.

First, the relationship between the slit 31 and the alignment direction of the liquid crystal layer 7 will be described with reference to FIG. 8. FIG. 8 is a diagram showing the planar structure of the subpixel 71. In FIG. 8, the relationship between the extension direction of the slit 31 and the alignment direction of the liquid crystal layer 7 is focused on. For this reason, a thin film transistor and the like are not shown.

The planar structure of FIG. 8 is identical to the planar structure described with reference to FIG. 2, and the corresponding elements are represented by the same reference numerals. That is, the subpixel 71 is formed in a rectangular region surrounded by the signal lines 21 extending in the Y direction and the scanning lines 23 extending in the X direction. The pixel electrode 13 has five electrode branches 13A and connection portions 13B respectively connecting both ends of the electrode branches 13A. In FIG. 8, the slits 31 formed between the electrode branches 13A or the slit 31 formed between the electrode branches 13A and the signal line 21 on the right side in the drawing extend in the Y direction.

That is, the extension direction of each slit 31 is parallel to the signal line 21 and perpendicular to the scanning line 23.

In FIG. 8, the alignment direction of the liquid crystal layer 7 is indicated by an arrow. In FIG. 8, the oblique upper right direction with respect to the paper is the alignment direction of the liquid crystal layer 7. In FIG. 8, the cross angle between the alignment direction of the liquid crystal layer 7 and the extension direction of each slit 31 is indicated by $\alpha$.

The inventors have focused on the cross angle $\alpha$, and have measured the time until display irregularity disappears with respect to various cross angles $\alpha$.

Figure 9:
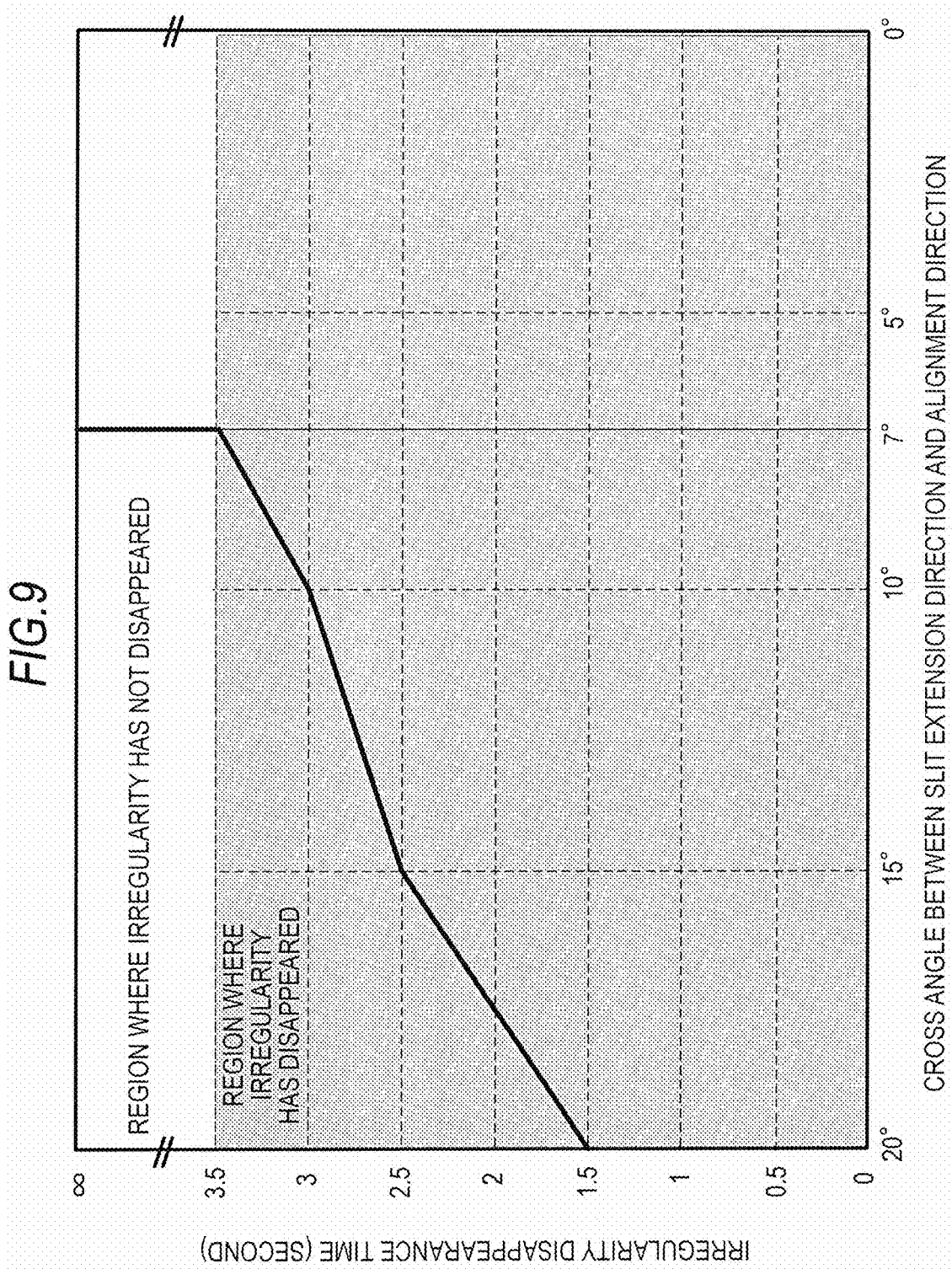
FIG. 9 is a diagram illustrating the relationship between the magnitude of a cross angle and display irregularity disappearance time.

FIG. 9 shows the measurement result. In FIG. 9, the horizontal axis represents the cross angle $\alpha$ between the extension direction of each slit 31 and the alignment direction of the liquid crystal layer 7, and the vertical axis represents the time until display irregularity disappears.

From the experiment result of FIG. 9, it has been confirmed that, when the cross angle $\alpha$ is smaller than 7°, display irregularity due to the reverse twist phenomenon does not disappear by itself.

Meanwhile, when the cross angle $\alpha$ is equal to or larger than 7°, it has been confirmed that the reverse twist line can disappear by itself. When the cross angle $\alpha$ is 7°, the time until display irregularity disappears is 3.5 [seconds]. Further, from the experiment result, it has been confirmed that, as the cross angle $\alpha$ becomes larger, the time until display irregularity disappears is shortened. For example, when the cross angle $\alpha$ is 10°, it has been confirmed that display irregularity disappears in 3 [seconds]. When the cross angle $\alpha$ is 15°, it has been confirmed that display irregularity disappears in 2.5 [seconds]. When the cross angle $\alpha$ is 20°, it has been confirmed that display irregularity disappears in 1.5 [seconds].

As a result, the inventors have found that, if the cross angle $\alpha$ between the extension direction of each slit 31 and the alignment direction of the liquid crystal layer 7 is set to be equal to or larger than 7°, in the transverse electric field display type liquid crystal panel, the alignment stability of liquid crystal molecules can be improved. That is, it has been found that, even though the reverse twist phenomenon occurs due to finger press or the like, the disturbance of the alignment can disappear by itself.

Figure 10:
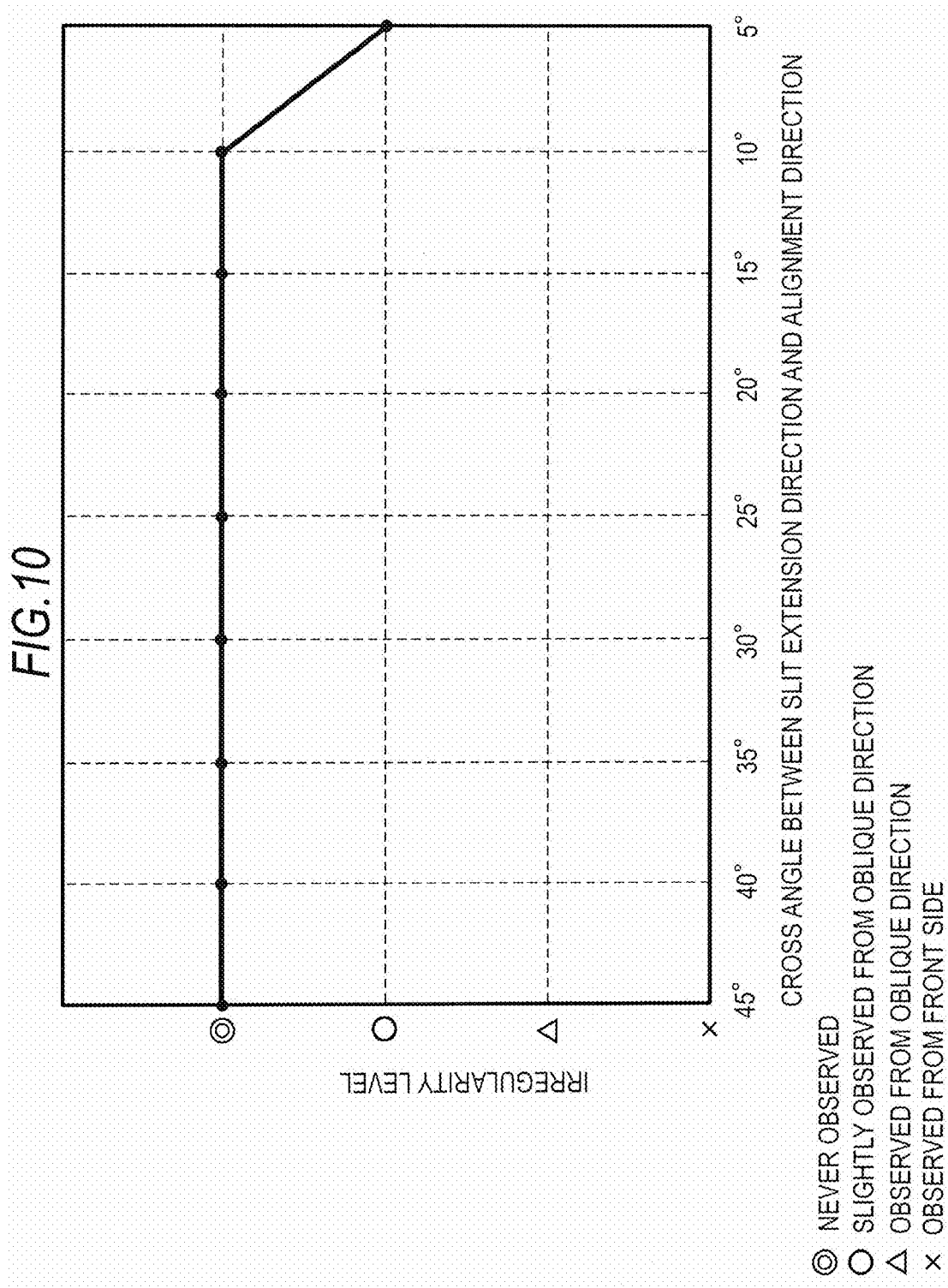
FIG. 10 is a diagram illustrating the relationship between the magnitude of a cross angle and the level of display irregularity.

FIG. 10 shows the observation result regarding the relationship between the cross angle $\alpha$ and the level of display irregularity. In FIG. 10, the horizontal axis denotes the cross angle $\alpha$ between the extension direction of the slit 31 and the alignment direction of the liquid crystal layer 7, and the vertical axis denotes the visible level of display irregularity.

As shown in FIG. 10, if the cross angle $\alpha$ is equal to or larger than 10°, it has been confirmed that no display irregularity is observed even when the display screen is viewed at any angle. When the cross angle $\alpha$ is 5°, it has been confirmed that, when the display screen is viewed from an oblique direction, slight display irregularity is observed. When the cross angle $\alpha$ is equal to or larger than 5° and smaller than 10°, as shown in FIG. 10, it has been confirmed that visibility is gradually changed.

Figure 11:
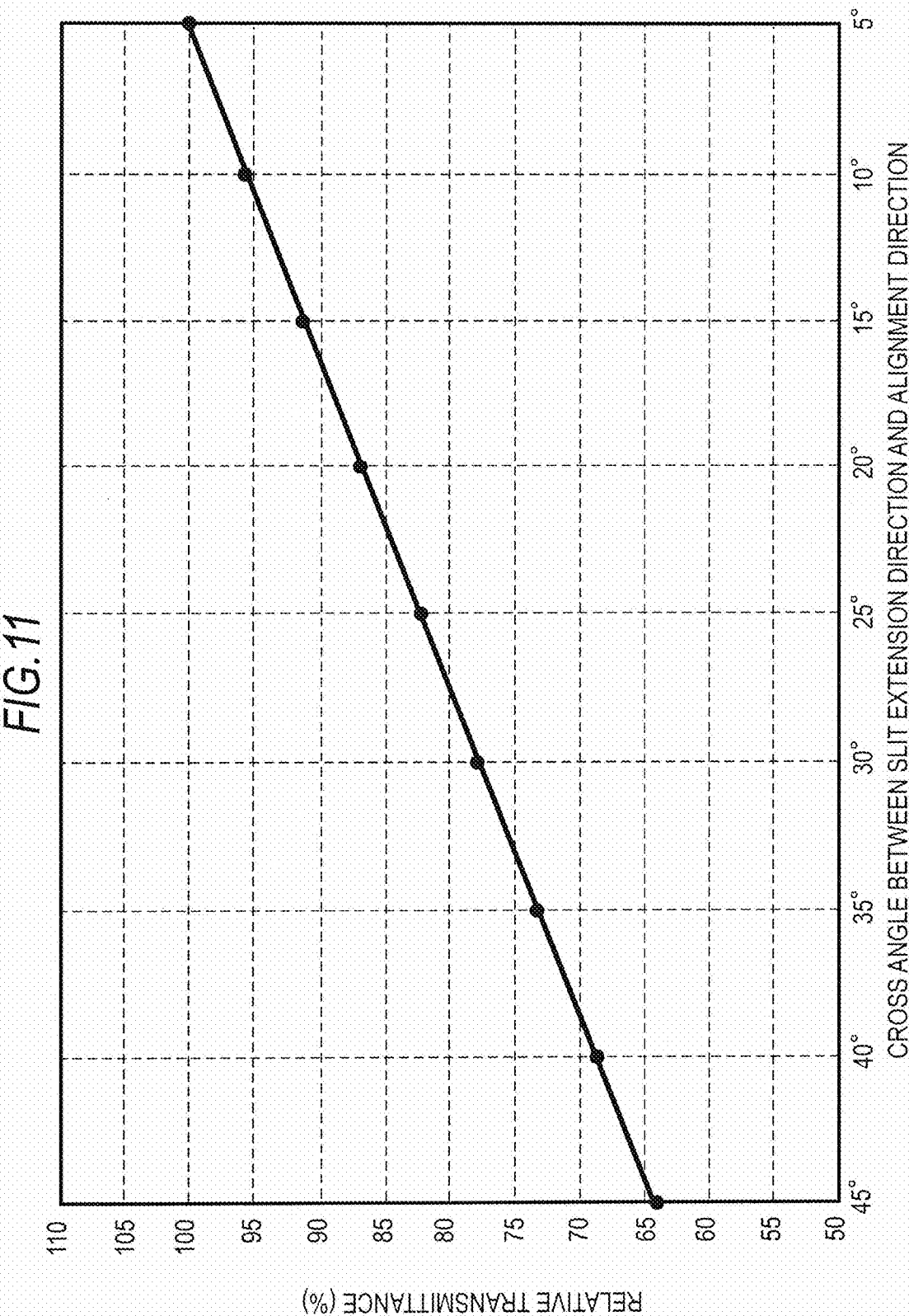
FIG. 11 is a diagram illustrating the relationship between the magnitude of a cross angle and relative transmittance.

However, it has been confirmed that, if the cross angle $\alpha$ is extremely large, the transmittance is lowered. FIG. 11 shows the confirmed transmission characteristics. In FIG. 11, the horizontal axis denotes the cross angle $\alpha$ between the extension direction of the slit 31 and the alignment direction of the liquid crystal layer 7, and the vertical axis denotes relative transmittance. In FIG. 11, it is assumed that, when the cross angle $\alpha$ is 5°, the relative transmittance is 100%.

In FIG. 11, when the cross angle $\alpha$ is 5°, the maximum transmittance is obtained, and when the cross angle $\alpha$ is 45°, the minimum transmittance is obtained. Note that, when the cross a is 45°, the relative transmittance is about 64%.

As shown in FIG. 11, it has been seen that the cross angle $\alpha$ and the relative transmittance have a roughly linear relationship. From the viewpoint of transmittance, it can be seen that, as the cross angle $\alpha$ is smaller, better display luminance is obtained.

The characteristics shown in FIGS. 9 to 11 are obtained on the assumption that each slit 31 of the pixel electrode 12 crosses the alignment direction of the liquid crystal layer 7 at a predetermined cross angle $\alpha$ over the entire pixel region, as shown in FIG. 8. In this case, if the cross angle $\alpha$ is set while placing priority on the reduction in the disappearance time of display irregularity, the relative transmittance decreases. If the cross angle $\alpha$ is set while placing priority on the relative transmittance, the disappearance time of display irregularity increases.

Accordingly, the inventors have suggested that the cross angle $\alpha$ is set to be equal to or larger than 7° and equal to or smaller than 15°. This is because it is considered that, if the cross angle $\alpha$ falls within the range, the disappearance time of display irregularity and the relative transmittance can be maintained at a satisfactory level.

Further, the inventors have experimentally confirmed the effects when the condition on the cross angle $\alpha$ is partially applied to the pixel region. Hereinafter, the experiment result will be described.

Figure 12:
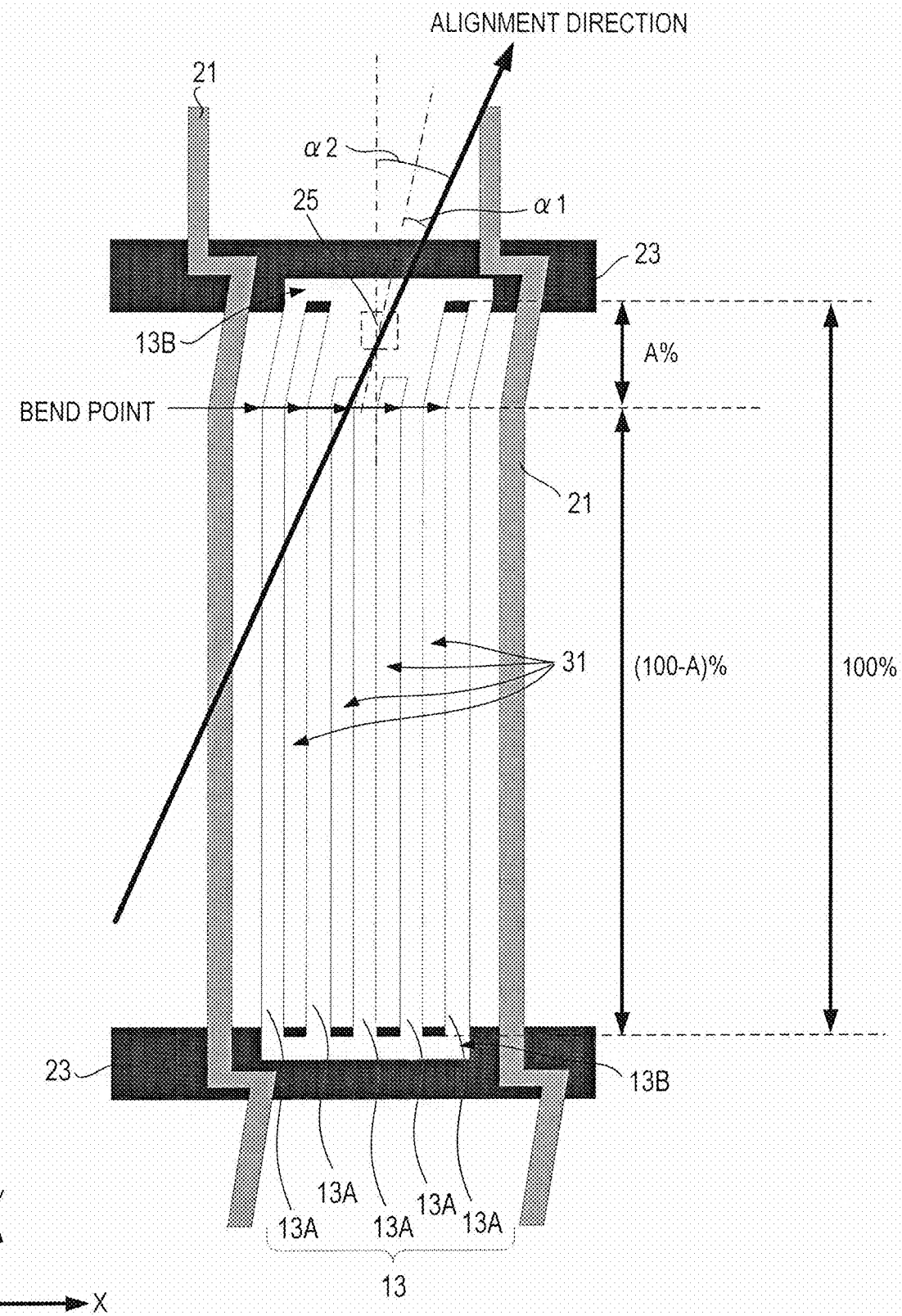
FIG. 12 is a diagram illustrating the cross angle between the extension direction of a slit and the alignment direction of a liquid crystal layer when a bent region is provided in a portion of a pixel region.
Figure 13:
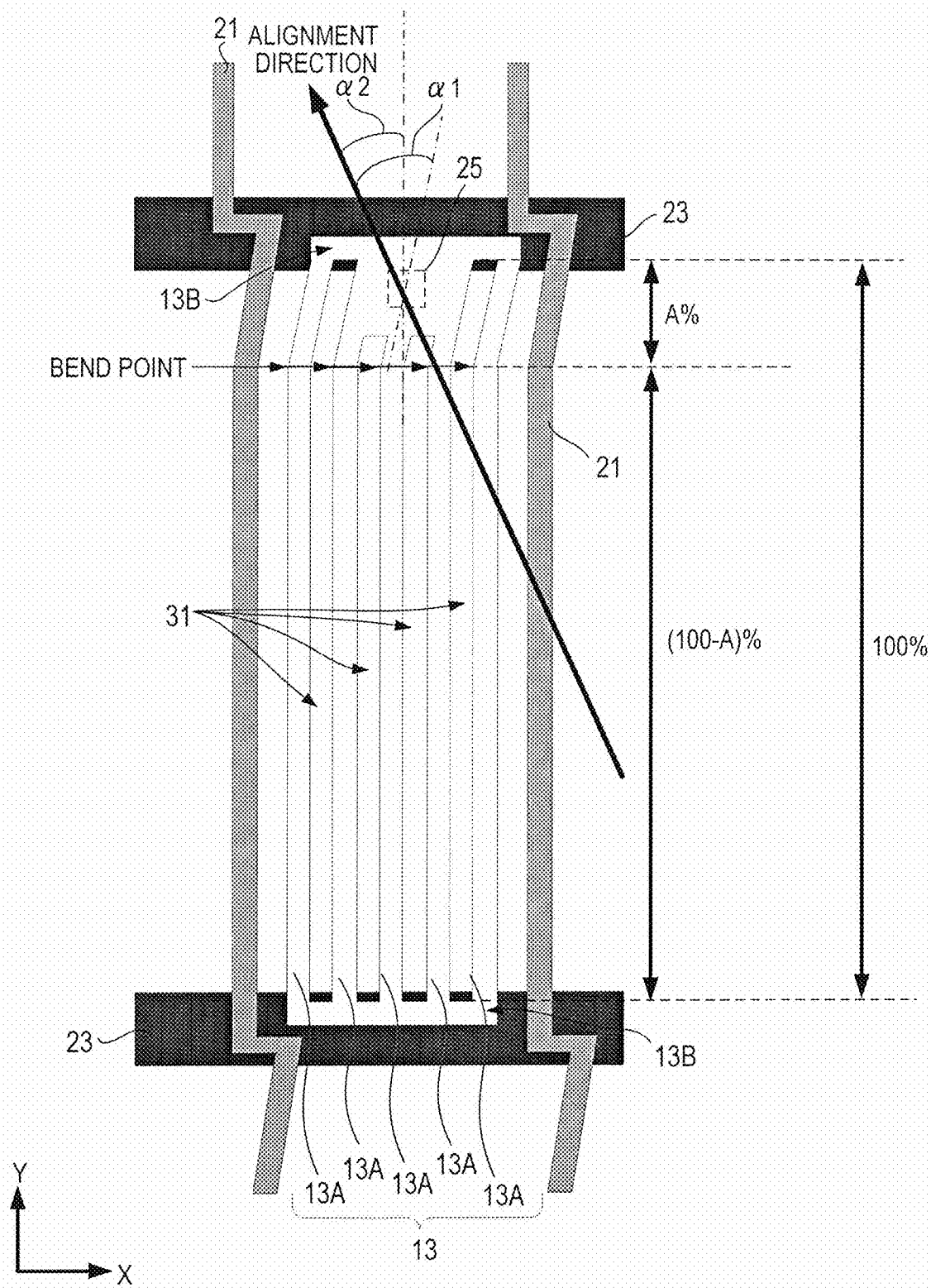
FIG. 13 is a diagram illustrating the cross angle between the extension direction of a slit and the alignment direction of a liquid crystal layer when a bent region is provided in a portion of a pixel region.

FIGS. 12 and 13 show planar structure examples of a subpixel 71 used in the experiment.

The planar structure shown in FIG. 12 or 13 is identical to the planar structure described with reference to FIG. 8, and the corresponding elements are represented by the same reference numerals. That is, the subpixel 71 is formed in a rectangular region surrounded by the signal lines 21 extending in the Y direction and the scanning lines 23 extending in the X direction. In FIG. 12 or 13, the pixel electrode 13 has five electrode branches 13A and connection portions 13B connecting both ends of the electrode branches 13A.

A difference from FIG. 8 is that that one bend point is provided around the contact 25 for each electrode branch 13A, that is, in the upper pixel portion, and the electrode pattern of the rectangular electrode branches 13A is bent at the bend point.

In FIG. 12 or 13, an electrode pattern is taken into consideration in which the electrode branches 13A near the center of the pixel region from the bend point are parallel to the signal line 21, and the electrode branches 13A near the contact 25 from the bend point are inclined in the right direction of the drawing with respect to the signal line 21.

In FIGS. 12 and 13, the area of a bent portion (the area near the contact 25 from the bend point) to the area of the entire pixel region is indicated by A %. Thus, the area excluding the bent portion is (100–A) %.

In FIGS. 12 and 13, the cross angle between the extension direction of each slit 31 formed by the electrode branches 13A near the contact 25 from the bend point and the alignment direction of the liquid crystal layer 7 is indicated by $\alpha 1$. Further, the cross angle between the extension direction of each slit 31 formed in parallel to the signal 21 and the alignment direction of the liquid crystal layer 7 is indicated by $\alpha 2$. FIG. 12 shows an example where the alignment direction is the upper right direction in the drawing and the relationship α2>α1 is established between the slit extension direction and the alignment direction of the liquid crystal layer 7. FIG. 13 shows an example where the alignment direction is the upper left direction in the drawing and the relationship α1>α2 is established between the slit extension direction and the alignment direction of the liquid crystal layer 7.

Figure 14:
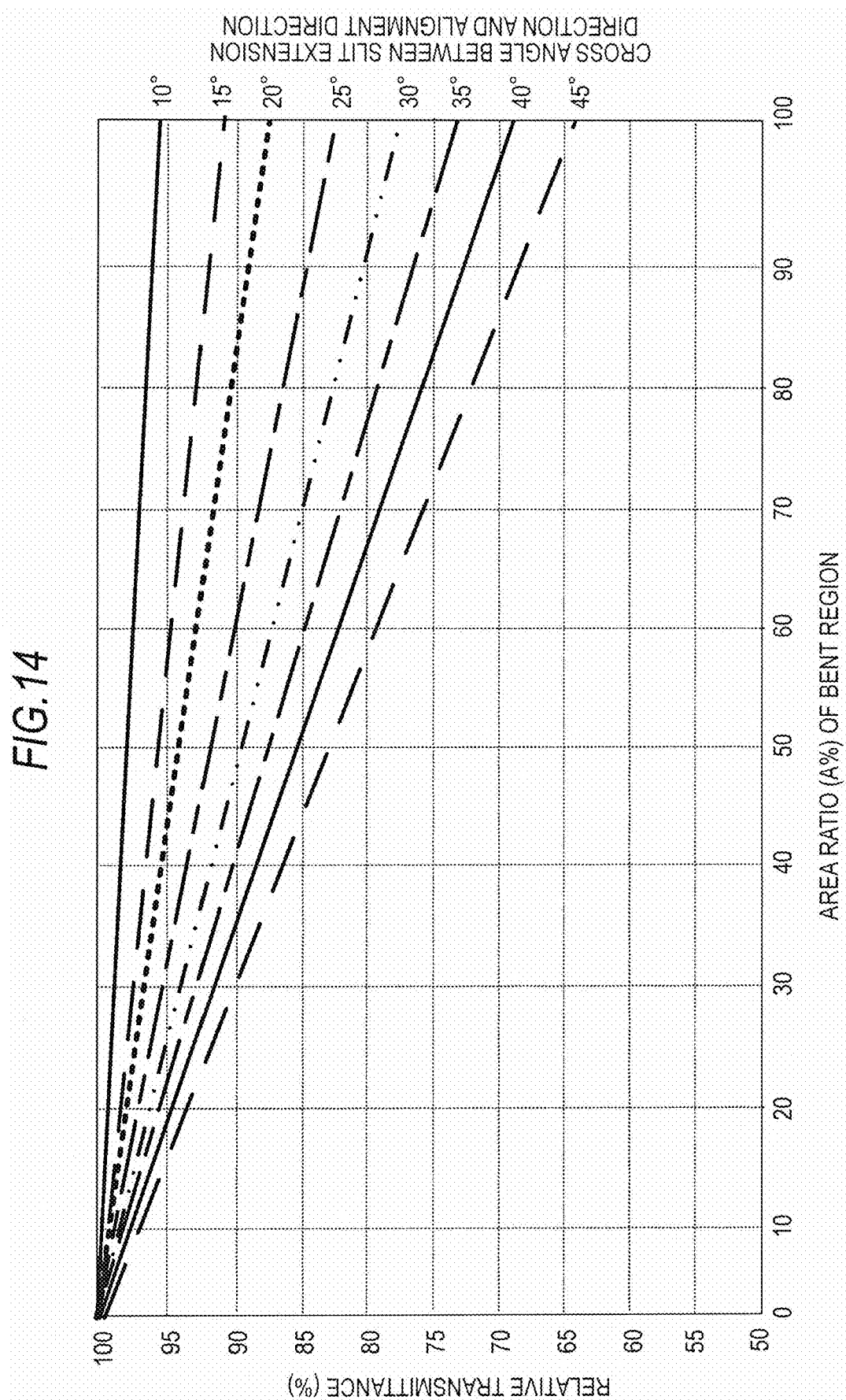
FIG. 14 is a diagram illustrating the relationship between the area ratio of a bent region and relative transmittance according to the magnitude of a cross angle.

FIG. 14 shows the experiment result. FIG. 14 shows the measurement result of a change in the relative transmittance due to a difference in the area ratio A (%) of the bent portion for each cross angle. In FIG. 14, the horizontal axis represents the area ratio of a bent portion to the entire pixel region, and the vertical axis represents the relationship between the cross angle and the relative transmittance. The lines in the drawing respectively indicate the characteristics measured for the cross angles α1 10°, 15°, 20°, 25°, 30°, 35°, 40°, and 45°.

As shown in FIG. 14, when the area ratio A of the bent portion is 0%, the relative transmittance is 100%, regardless of the magnitude of the cross angle α1. Note that the case where the area ratio A of the bent portion is 0% refers to the pixel structure of FIG. 8.

It has been confirmed that, if the area ratio A of the bent portion is large, the relative transmittance is lowered, regardless of the magnitude of the cross angle α1.

Figure 15:
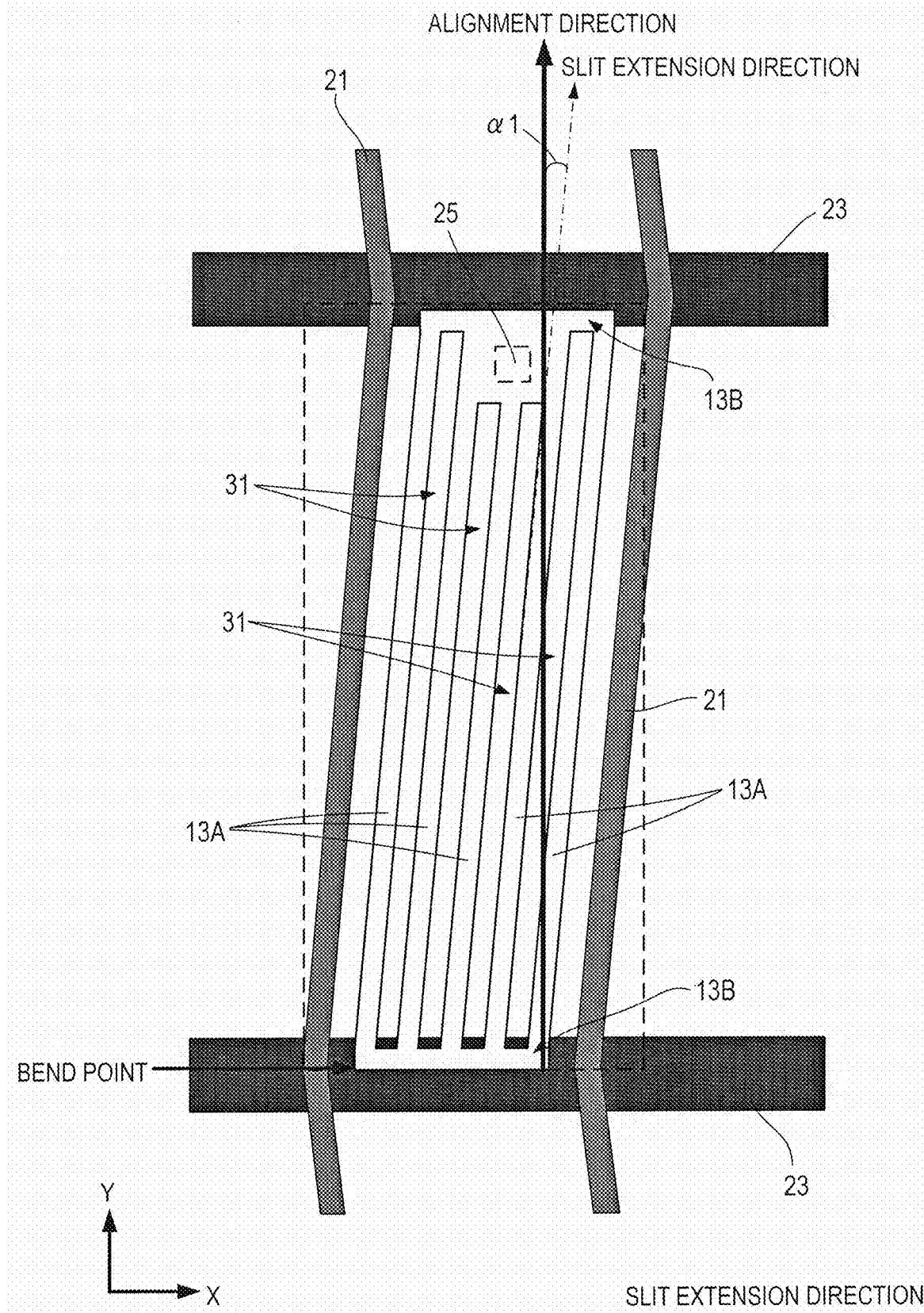
FIG. 15 is a diagram showing a pixel structure example when the area ratio of a bent region is 100%.

FIG. 15 shows an example of a pixel structure example in which the area ratio A of the bent portion is 100%. The relative transmittance characteristics obtained for the pixel structure shown in FIG. 15 correspond to FIG. 11 described above.

Similarly to the characteristics of FIG. 11, as the cross angle α1 is smaller, the relative transmittance is higher, and as the cross angle α1 is larger, the relative transmittance is lowered.

As will be seen from FIG. 14, if the portion where the electrode branches 13A of the pixel electrode 13 are bent is limited to a portion of the pixel region, the relative transmittance of the pixel region can be increased, as compared with the pixel structure (FIG. 15) which the bent portion is the entire pixel region.

In this case, the upper limit of the area ratio A differs depending on the pattern structure of the pixel electrode 13 to be used or the cross angle α1 with respect to the alignment direction of the liquid crystal layer 7, but a predetermined degree of transmission should be obtained. For example, the target relative transmittance of 80% is taken into consideration. In FIG. 14, if the area ratio A of the bent portion is set to be 50% or smaller of the area of the pixel region, the condition on the transmittance can be satisfied, regardless of the magnitude of the cross angle α1.

The lower limit of the area ratio A is set taking into consideration the resolution limit in the manufacturing process. In general, as the area ratio A is smaller, the relative transmittance is higher, regardless of the magnitude of the cross angle α1. Therefore, it has been considered that, for practical use, it is preferable to set the area ratio A to be small in a state where the cross angle α1 is set large.

(C) Pixel Structure Example 1

Figure 16:
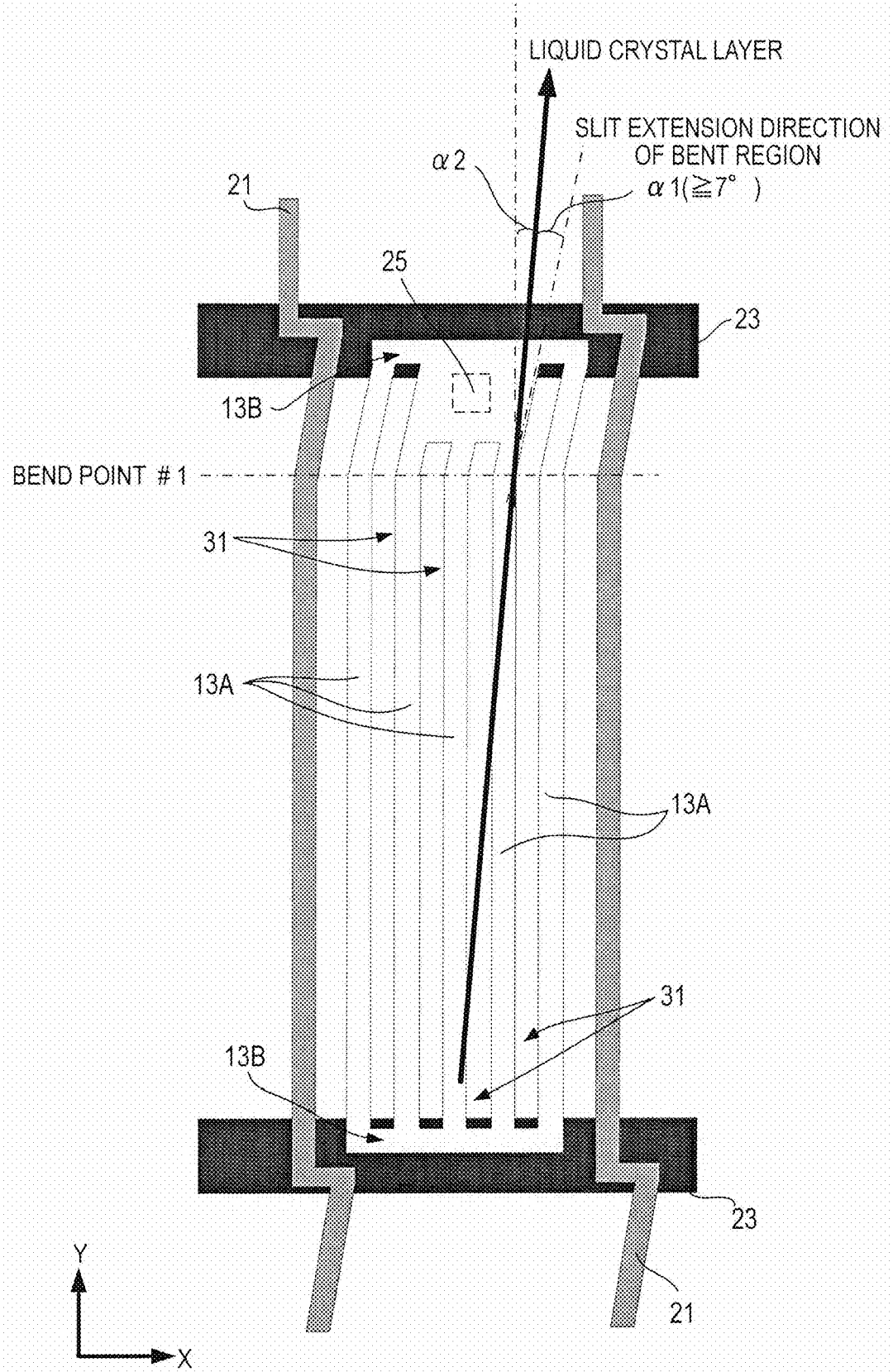
FIG. 16 is a diagram showing a first pixel structure example (planar structure).

The pixel structure shown in FIG. 16 is identical to the pixel structure described with reference to FIG. 12 or 13 and supposes an FFS (Fringe Field Switching) type liquid crystal panel.

Thus, the sectional structure of the pixel region is as shown in FIG. 1. That is, the counter electrode 15 is disposed below the pixel electrode 13 so as to cover the entire pixel region.

Like FIG. 12 or 13, the pixel structure shown in FIG. 16 is a pixel structure in which one bend point is provided. The bend point is provided around the contact 25. In FIG. 16, the area of the bent region is enlarged for ease of understanding of the extension direction of the slit 31 extending from the bend point toward the contact 25.

In FIG. 16, the extension direction of a slit 31 formed near the center of the pixel region from the bend point is parallel to the signal line 21. The extension direction of the slit 31 extending from the bend point toward the contact 25 crosses the alignment direction of the liquid crystal layer 7 at the cross angle α1 of 7° or larger. That is, FIG. 16 shows a pixel structure in which the slit 31 and the alignment direction cross each other at an angle of 7° or larger only in a region around the contact 25, and the slit 31 and the alignment direction cross each other at an angle smaller than 7° in the remaining pixel region.

Most of reverse twist lines occur since disclination at the end portion of the slit 31 around the contact 25 grows along the slit 31 during the application of external pressure.

In contrast, in the pixel structure of FIG. 16, the bent region is provided around the contact 25, so the alignment stability in the region can be increased. As a result, disclination growth can be suppressed.

Of course, if disclination growth is suppressed, the occurrence of reverse twist lines is suppressed. Further, even though a reverse twist line occurs, the reverse twist line can be rapidly eliminated. In the pixel region excluding the bent region, the cross angle α2 between the slit extension direction and the alignment direction is smaller than 7°, so the relative transmittance approaches 100%.

Therefore, a liquid crystal panel with high screen luminance and a small number of reverse twist lines (residual images) can be realized, as compared with the related art.

If the area ratio A of the bent region is set to be significantly small, as shown in FIG. 14, the transmittance over the entire pixel region can be further increased, while the effect on the alignment stability can be increased. From the viewpoint of the balance between the alignment regulation force and the transmittance, it is preferable that the cross angle α1 is in the range of about 7° to 15°.

(D) Pixel Structure Example 2

Figure 17:
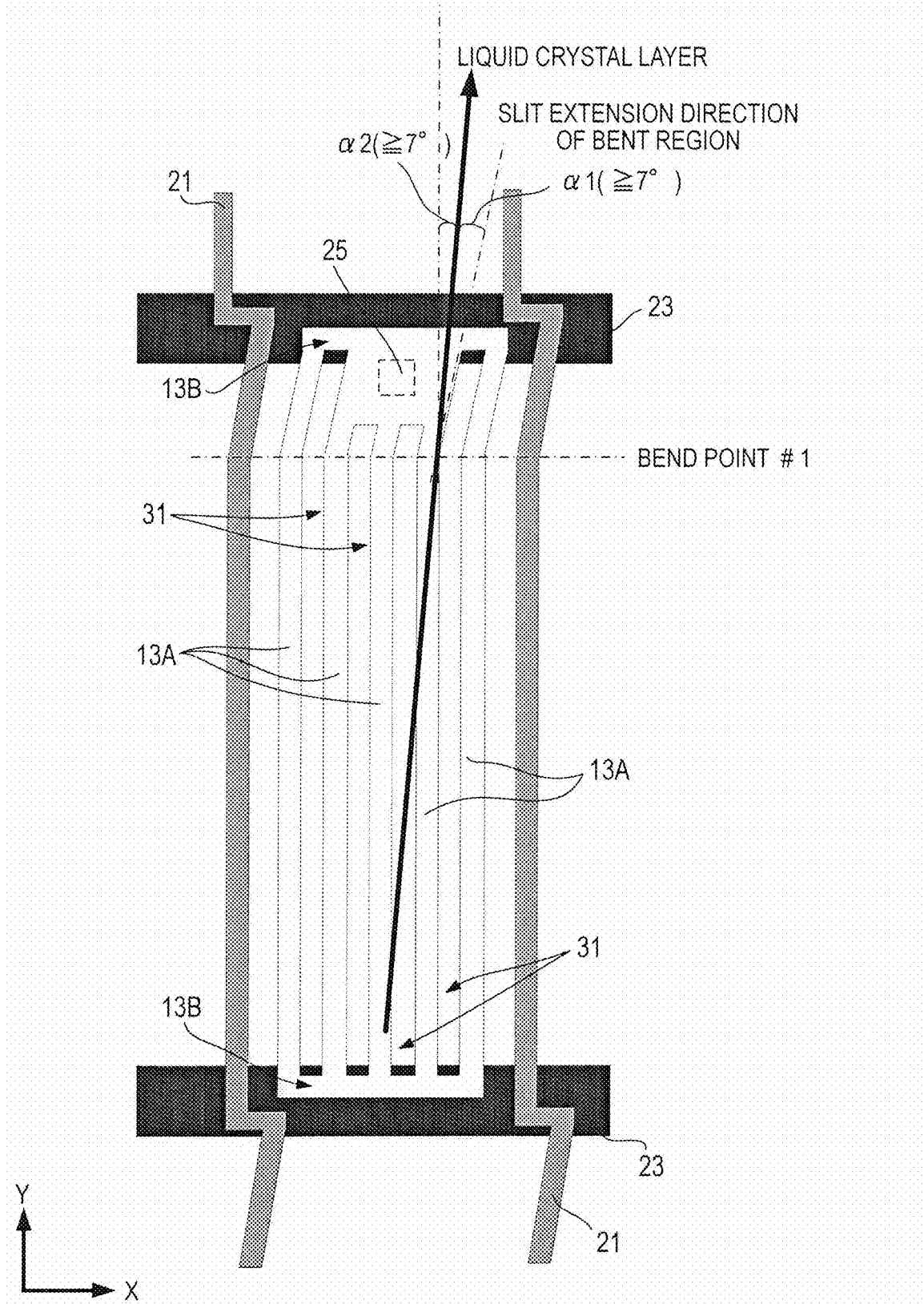
FIG. 17 is a diagram showing a second pixel structure example (planar structure).

FIG. 17 shows a second pixel structure example. This pixel structure also supposes an FFS (Fringe Field Switching) type liquid crystal panel.

In FIG. 17, the cross angle α2 between the extension direction of each slit 31 formed in the pixel region excluding the bent region and the alignment direction of the liquid crystal layer 7 is equal to or larger than 7°. The cross angle α1 between the extension direction of each slit 31 formed in the bent region and the alignment direction of the liquid crystal layer 7 is equal to or larger than the above-described cross angle α2.

In this pixel structure, the cross angle α1 between the extension direction of each slit 31 corresponding to the bent region and the alignment direction of the liquid crystal layer 7 can be set to be equal to or larger than 7°, so as in the pixel structure example 1, the alignment stability can be increased and disclination growth can be suppressed.

In this pixel structure, with regard to the pixel region (the central portion of the pixel region) excluding the bent region, the extension direction of each slit 31 and the alignment direction of the liquid crystal layer 7 cross each other at the angle α2 of 7° or larger. For this reason, even though a reverse twist line temporarily grows to the region, the reverse twist line can disappear by itself in a short time.

As described above, with this pixel structure, a liquid crystal panel can be realized in which the alignment stability during voltage application can be improved over the entire pixel region, and even though a reverse twist line temporarily occurs, the reverse twist line can disappear by itself. That is, a liquid crystal panel which achieves higher display quality than the pixel structure example 1 can be realized.

(E) Pixel Structure Example 3

Figure 18:
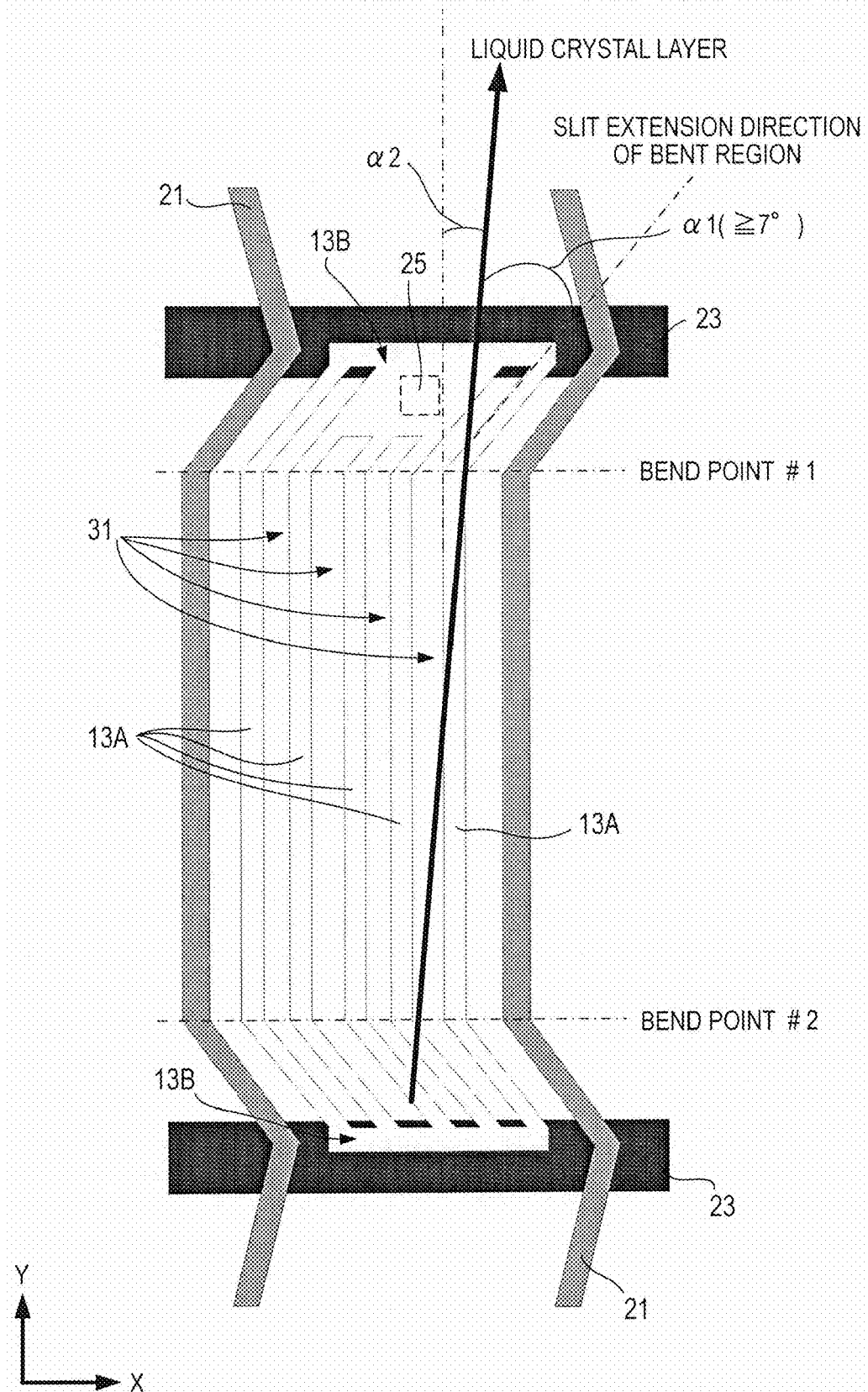
FIG. 18 is a diagram showing a third pixel structure example (planar structure).

FIG. 18 shows a third pixel structure example. This pixel structure also supposes an FFS liquid crystal panel.

This pixel structure is also identical to the above-described two pixel structures, and corresponds to a pixel structure example with a single domain structure. This pixel structure example has a feature that two bend points (bent regions) are provided. Specifically, a second bend point is provided around the connection portion 13B on the side opposite to the contact 25.

This is to increase the alignment regulation force around both ends of the electrode branches 13A so as to shorten the time until a reverse twist line disappears. Of course, in this pixel structure, disclination which occurs at the end portions of the electrode branches 13A on the side opposite to the contact 25 can also be suppressed.

In the pixel structure example of FIG. 18, the positions of the bend points and the bend directions are set to be mirror-symmetric with respect to the center of the pixel region, but actually, the application is not limited thereto. For example, point-symmetry or asymmetry may be used.

Of course, if the area ratio of the bent region to the entire pixel region increases, the transmittance is lowered, so it is preferable that the bent region is as small as possible. With regard to the bent region, from the viewpoint of the balance between the alignment regulation force and the transmittance, it is preferable that the cross angle α1 is in the range of about 7° to 15°.

(F) Pixel Structure Example 4

Figure 19:
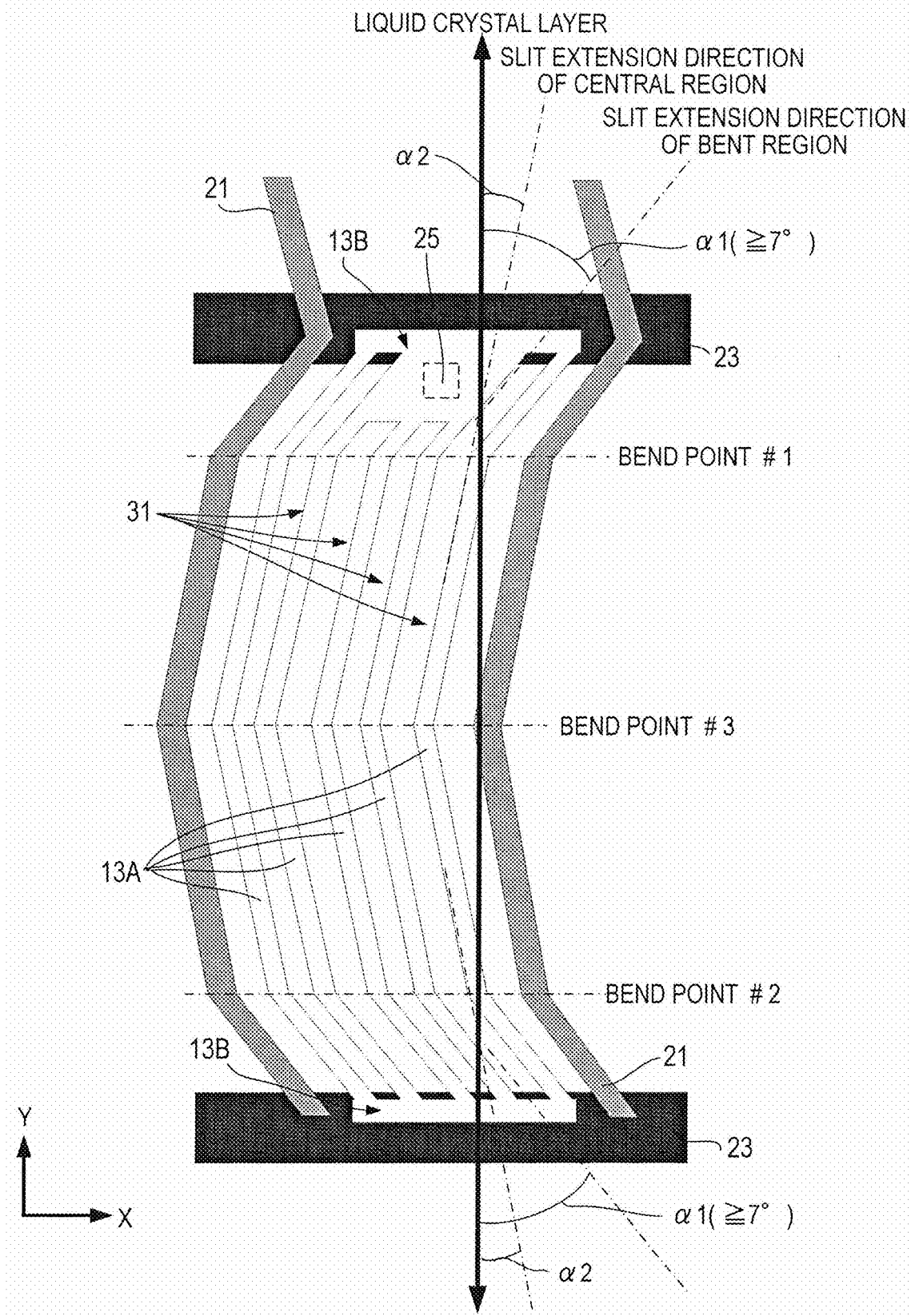
FIG. 19 is a diagram showing a fourth pixel structure example (planar structure).

FIG. 19 shows a fourth pixel structure example. This pixel structure also supposes an FFS liquid crystal panel.

In the pixel structure example of FIG. 19, a third bend point is provided around the center of the pixel region. The pixel structure of FIG. 19 has a vertical mirror structure from a virtual line extending from the third bend point in the X-axis direction, but actually, the application is not limited thereto.

In the pixel structure example of FIG. 19, in the two bent regions at both ends of the pixel region, the alignment direction of the liquid crystal layer 7 and the extension direction of each slit 31 cross each other at an angle of 7° or larger.

In FIG. 19, a structure in which the pixel electrode 13 has a vertical mirror structure along a virtual line extending in the X-axis direction has been focused on, so the alignment direction of the liquid crystal layer 7 is set to be parallel to the Y-axis direction.

In the bent region at the center of the pixel region including the bend point 3, it is assumed that the cross angle α2 between the alignment direction of the liquid crystal layer 7 and the extension direction of the slit 31 is arbitrary. This is because the bend point 3 formed at the center of the pixel region is merely formed to improve the viewing angle dependency first of all.

Of course, if the cross angle α2 between each slit 31 formed between the bend point 3 and the bend point 1 and the alignment direction of the liquid crystal layer 7 is equal to or larger than 7°, the alignment stability increases. Therefore, even though a reverse twist line temporarily occurs, the reverse twist line can be reliably eliminated. For the same reason, it is preferable that the cross angle α2 between each slit 31 formed between the bend point 3 and the bend point 2 and the alignment direction of the liquid crystal layer 7 is equal to or larger than 7°.

In this pixel structure, the rotation direction of the liquid crystal molecules is inverted between the upper half portion and the lower half portion of the pixel region. That is, in the upper half portion of the pixel region in the drawing, the liquid crystal molecules rotate in the counterclockwise direction by the application of an electric field. Meanwhile, in the lower half portion of the pixel region of the drawing, the liquid crystal molecules rotate in the clockwise direction.

As described above, the rotation direction of the liquid crystal molecules is inverted, which compensates for the viewing angle dependency in the oblique direction, so the viewing angle dependency can be improved.

(G) Pixel Structure Example 5

Figure 20:
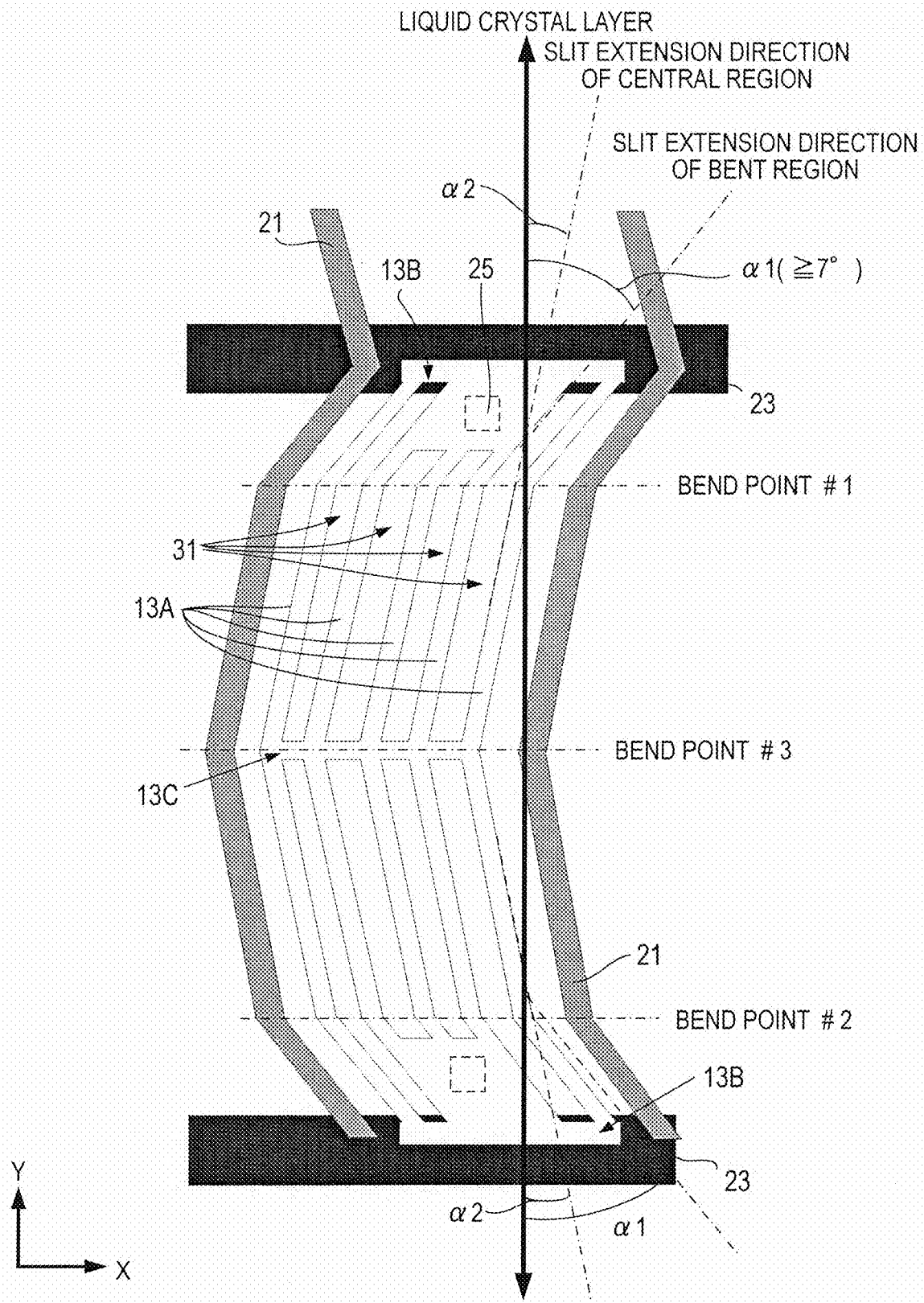
FIG. 20 is a diagram showing a fifth pixel structure example (planar structure).

FIG. 20 shows a fifth pixel structure example. This pixel structure corresponds to a modification of the dual domain structure shown in FIG. 19.

A difference is that at the third bend point, a connection branch 13C connecting the electrode branches 13A to each other is further provided.

In the pixel structure of FIG. 19, the rotation direction of the liquid crystal molecules is inverted at the boundary between two upper and lower domains, and alignment disturbance is likely to occur. For this reason, when a reverse twist line occurs, there is a significant adverse effect on the disappearance of the reverse twist line.

Meanwhile, in the pixel structure of FIG. 20, the two domains are completely separated from each other by the connection branch 13C. Thus, alignment disturbance can be eliminated. As a result, with the pixel structure shown in FIG. 20, the time until a reverse twist line disappears can be further shortened than the pixel structure shown in FIG. 19, and display quality can be increased by as much.

(H) Pixel Structure Example 6

Figure 21:
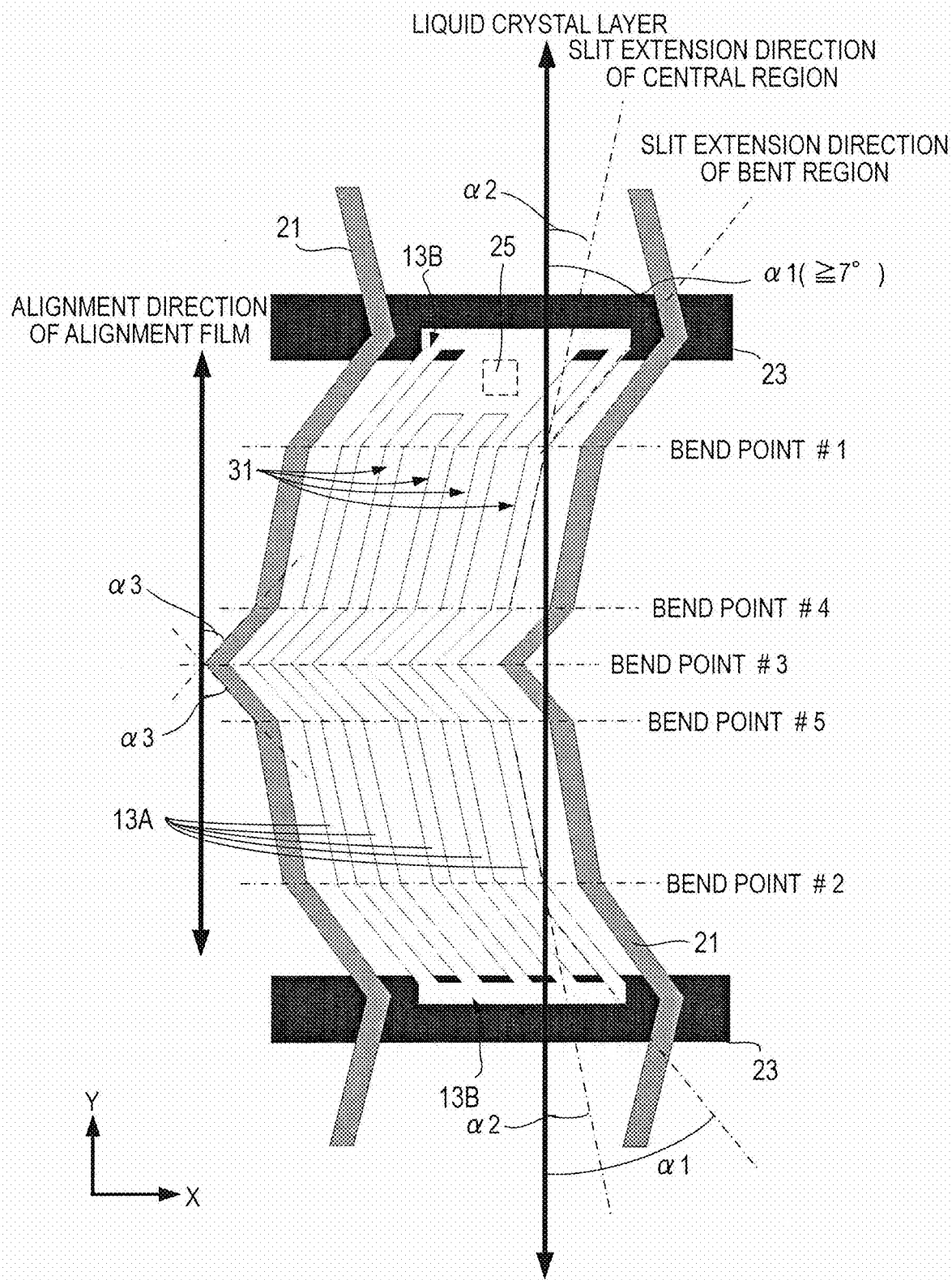
FIG. 21 is a diagram showing a sixth pixel structure example (planar structure).

FIG. 21 shows a sixth pixel structure example. The pixel structure shown in FIG. 21 corresponds to a modification of the pixel structure shown in FIG. 19.

In the above-described sixth pixel structure example (FIG. 21), a method is used in which two domains are completely separated from each other to suppress alignment disturbance at the boundary between the domains.

Meanwhile, in this pixel structure example, a structure is used in which fourth and fifth bend points are formed around both sides of the third bend point. In this case, the pixel pattern is formed such that the cross angle α3 between the extension direction of each slit 31 formed between the third bend point and the fourth bend point and the alignment direction of the liquid crystal layer 7 is equal to or larger than 7°. Similarly, the pixel pattern is formed such that the cross angle α3 between the extension direction of each slit 31 formed between the third bend point and the fifth bend point and the alignment direction of the liquid crystal layer 7 is equal to or larger than 7°.

That is, in the sixth pixel structure example, a method is used in which the alignment stability increases in the region around the third bend point to suppress alignment disturbance at the boundary between the domains.

Of course, the pixel structure shown in FIG. 21 is identical to the fourth pixel structure shown in FIG. 19 in that the pixel structure has a vertical mirror structure from a virtual line extending from the third bend point in the X-axis direction.

That is, the extension direction of each slit in the bent regions formed around both end portions of the pixel region crosses the alignment direction of the liquid crystal layer 7 at the cross angle of 7° or larger. With this structure, the alignment stability at both end portions of the pixel region can be increased, and disclination can be effectively suppressed.

In the region between the first bend point and the fourth bend point, the cross angle α2 between the extension direction of the corresponding slit 31 and the alignment direction of the liquid crystal layer 7 is selected so as to ensure higher transmittance. The same is applied to the region between the second bend point and the fifth bend point.

With the above-described pixel structure, the time until disclination occurring at the upper and lower end portions of the pixel region and disclination occurring at the boundary between the domains disappear can be shortened. Further, even though reverse twist lines occurs in these regions due to external pressure, the reverse twist lines can be rapidly eliminated.

(I) Pixel Structure Example 7

Figure 22:
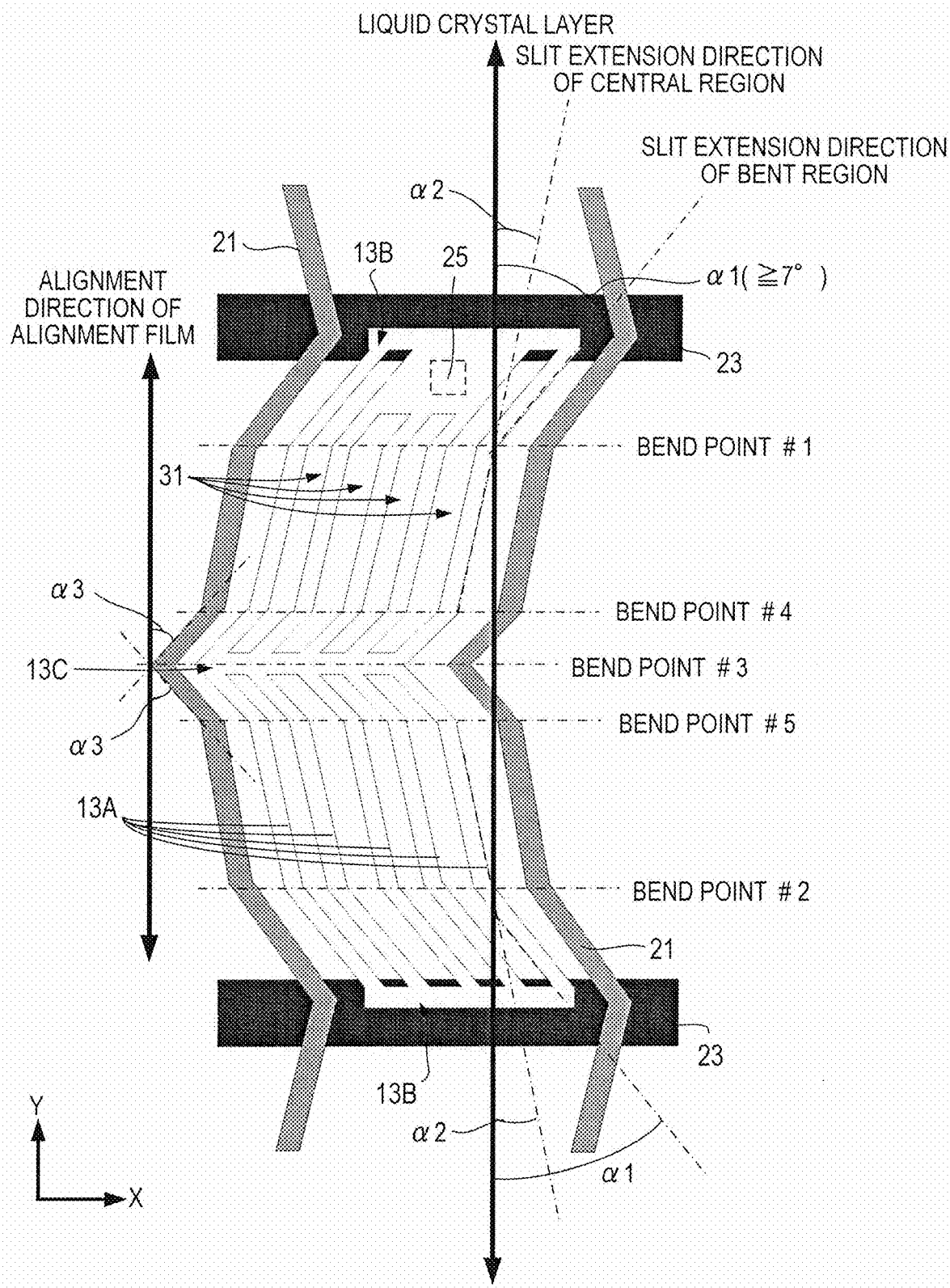
FIG. 22 is a diagram showing a seventh pixel structure example (planar structure).

FIG. 22 shows a seventh pixel structure example. The pixel structure shown in FIG. 22 corresponds to a modification of the pixel structure shown in FIG. 20.

In the sixth pixel structure example, the method is used in which the two domains are completely separated from each other to suppress alignment disturbance. However, in this pixel structure, disclination inevitably occurs in the region around the connection branch 13C.

Accordingly, in this pixel structure example, configuration is provided such that fourth and fifth bend points are newly formed around both sides of the third bend point to increase the alignment stability in the region around the connection branch 13C. In this case, the pixel pattern is formed such that the cross angle α3 between the extension direction of each slit 31 formed between the third bend point and fourth bend point and the alignment direction of the liquid crystal layer 7 is equal to or larger than 7°. Similarly, the pixel pattern is formed such that the cross angle α3 between the extension direction of each slit 31 formed between the third bend point and the fifth bend point and the alignment direction of the liquid crystal layer 7 is equal to or larger than 7°.

That is, in the seventh pixel structure example, a method is used in which the alignment stability in the region around the third bend point increases to suppress alignment disturbance.

Of course, the pixel structure shown in FIG. 22 is identical to the fifth pixel structure shown in FIG. 20 in that the pixel structure has a vertical mirror structure from a virtual line extending from the third bend point in the X-axis direction.

That is, the extension direction of each slit in the bent regions around both ends of the pixel region crosses the alignment direction of the liquid crystal layer 7 at the cross angle of 7° or larger. In these regions, the alignment stability increases.

The extension direction of each slit between the first bend point and the fourth bend point crosses the alignment direction of the liquid crystal layer 7 at the cross angle α2 which is selected so as to ensure high transmittance. Of course, the extension direction of each slit between the second bend point and the fifth bend point also crosses the alignment direction of the liquid crystal layer 7 at the cross angle α2 which is selected so as to ensure high transmittance.

The use of the above-described configuration makes it possible to shorten the time until disclination occurring at both end portions of the pixel region and disclination occurring at the boundary between the domains disappear. The time until the reverse twist line occurring at the central portion of the pixel region disappears can be shortened.

(J) Pixel Structure Example 8

In the above-described seven pixel structure examples, a liquid crystal panel has been described which has a pixel structure in which the counter electrode 15 is disposed below the comb-shaped pixel electrode 13 so as to cover the entire pixel region.

Figure 23:
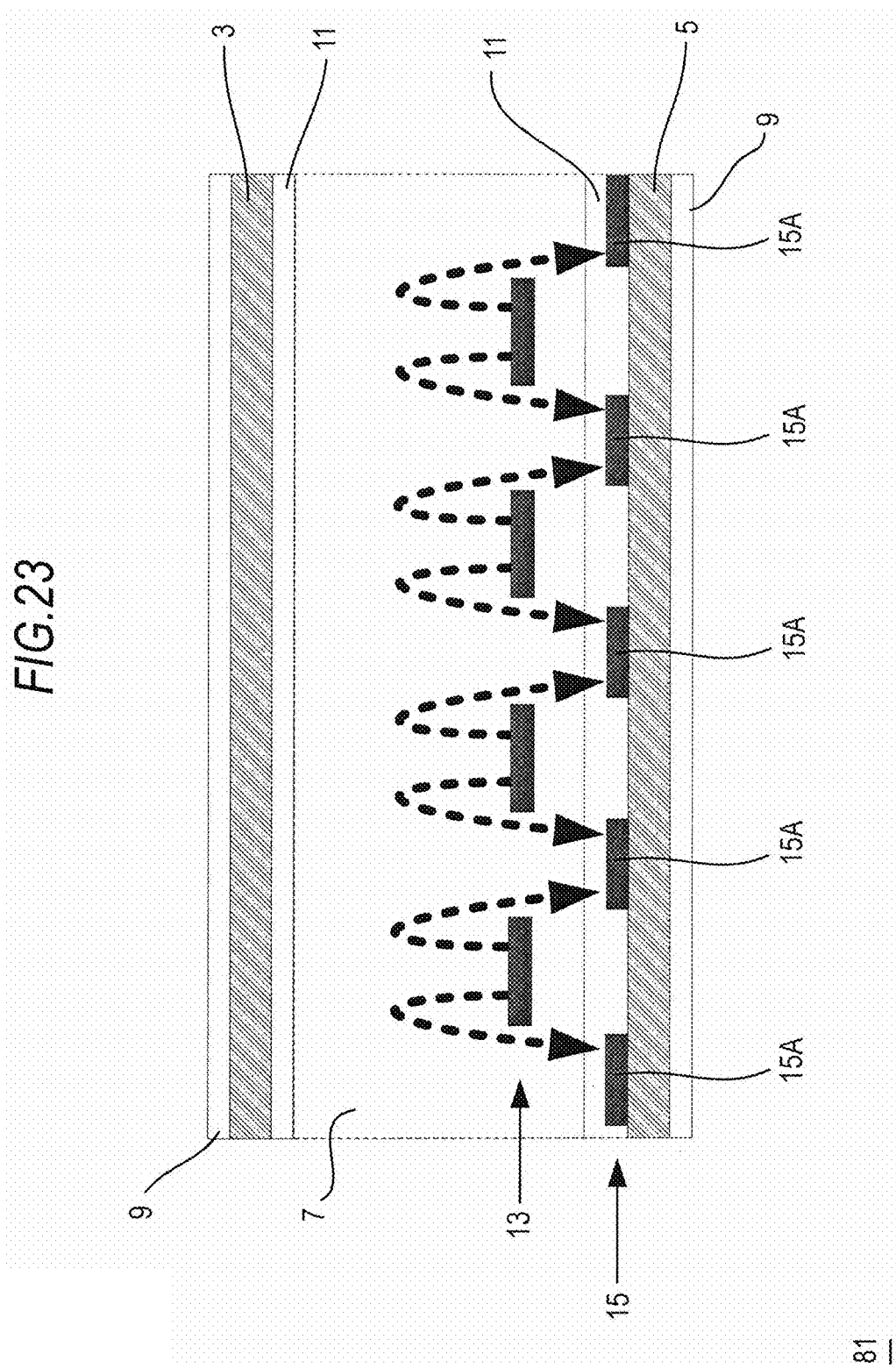
FIG. 23 is a diagram showing an eighth pixel structure example (planar structure).

Alternatively, as shown in FIG. 23, a liquid crystal panel having a comb-shaped counter electrode 15 may be adopted. In FIG. 23, the electrode branches 15A of the counter electrode 15 are disposed so as to fill the spaces (slits 31) between the electrode branches 13A of the pixel electrode 13. That is, the electrode branches 15A of the counter electrode 15 are disposed so as not to overlap the electrode branches 13A of the pixel electrode 13 in the pixel region.

(K) Pixel Structure Example 9

In the above-described pixel structure examples, the description has been made of the pixel structure in which the pixel electrode 13 and the counter electrode 15 are formed in different layers.

Alternatively, the technique which has been suggested by the inventors may be applied to a transverse electric field display type liquid crystal panel in which the pixel electrode 13 and the counter electrode 15 are formed in the same layer.

Figure 24:
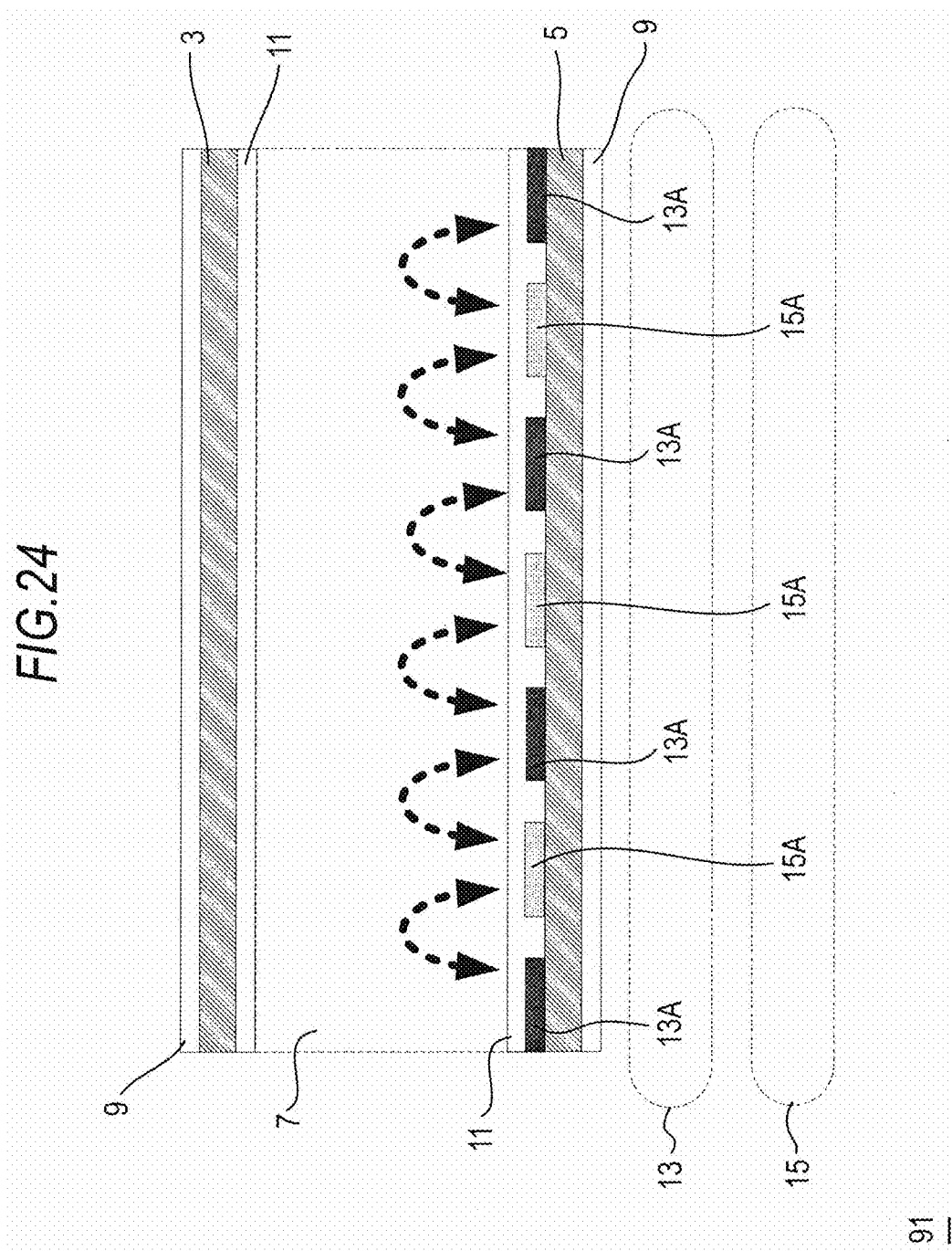
FIG. 24 is a diagram showing a ninth pixel structure example (sectional structure).

FIG. 24 shows a sectional structure example corresponding to a ninth pixel structure example. The structure excluding the pixel structure 13 and the counter electrode 15 is basically the same as the pixel structure described with reference to FIGS. 1 and 2.

That is, a liquid crystal panel 91 includes two glass substrates 3 and 5, and a liquid crystal layer 7 filled so as to be sandwiched with the glass substrates 3 and 5. A polarizing plate 9 is disposed on the outer surface of each substrate, and an alignment film 11 is disposed on the inner surface of each substrate.

In FIG. 24, the pixel electrode 13 and the counter electrode 15 are formed on the glass substrate 5. Of these, the pixel electrode 13 is structured such that one ends of comb-shaped four electrode branches 13A are connected to each other by a connection portion 13B. Meanwhile, the counter electrode 15 is structured such that one ends of comb-shaped three electrode branches 15A are connected to the common electrode line 33. In this case, the electrode branches 15A of the counter electrode 15 are disposed so as to be fitted into the spaces between the electrode branches 13A of the pixel electrode 13. The common electrode line 33 is formed in a lattice shape so as to follow the signal lines 21 and the scanning lines 23.

For this electrode structure, as shown in FIG. 24, the electrode branches 13A of the pixel electrode 13 and the electrode branches 15A of the counter electrode 15 are alternately disposed in the same layer. With this electrode structure, a parabolic electric field is generated between the electrode branches 13A of the pixel electrode 13 and the electrode branches 15A of the counter electrode 15. In FIG. 24, this electric field is indicated by a broken line.

With this pixel structure, a liquid crystal panel can be realized in which, even though the arrangement of the liquid crystal molecules is disturbed due to the reverse twist phenomenon caused by finger press or the like, the arrangement disturbance can be eliminated by itself in several seconds. Of course, a wide viewing angle according to a transverse electric field can be realized.

(L) Pixel Structure Example 10

In the above-described five pixel structure examples, a case where the extension direction of each slit 31 formed by the electrode branches 13A of the pixel electrode 13 is parallel to the signal line 21 or crosses obliquely with respect to the signal line 21 has been described.

Alternatively, the extension direction of each slit 31 formed by the electrode branches 13A of the pixel electrode 13 may be parallel to the scanning line 23 or may cross obliquely with respect to the scanning line 23.

(M) Other Examples (M-1) Substrate Material
In the above description of the examples, the substrate is a glass substrate, but a plastic substrate or other substrates may be used.

(M-2) Product Examples
In the above description, various pixel structures capable of generating a transverse electric field have been described. Hereinafter, description will be provided for electronic apparatuses in which a liquid crystal panel having the pixel structure according to the examples (with no driving circuit mounted therein) or a liquid crystal panel module (with a driving circuit mounted therein) is mounted.

Figure 25:
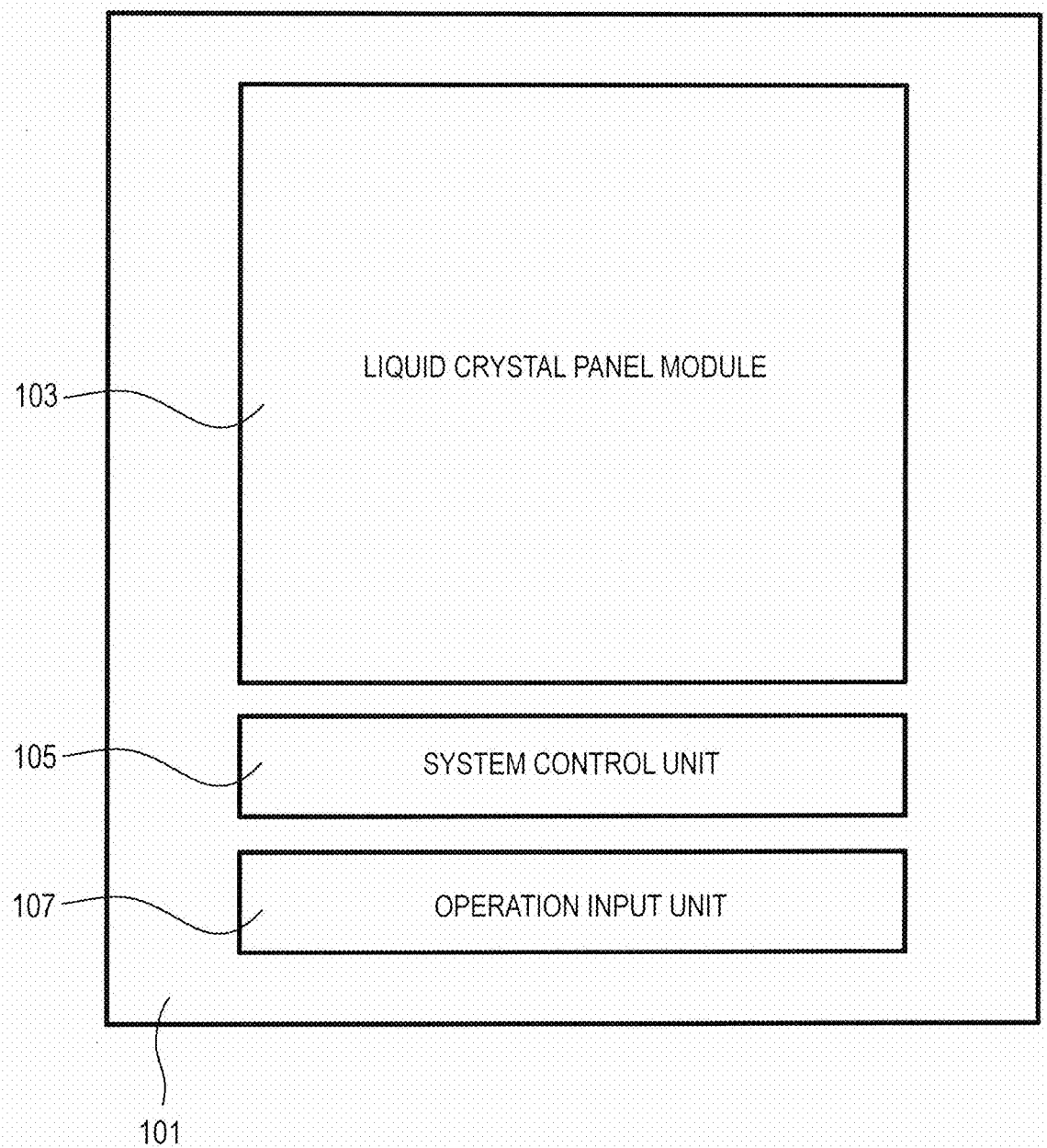
FIG. 25 is a diagram illustrating the system configuration of an electronic apparatus.

FIG. 25 shows a conceptual example of the configuration of an electronic apparatus 101. The electronic apparatus 101 includes a liquid crystal panel 103 having the above-described pixel structure, a system control unit 105, and an operation input unit 107. The nature of processing performed by the system control unit 105 varies depending on the product type of the electronic apparatus 101.

The configuration of the operation input unit 107 varies depending on the product type. A GUI (Graphic User Interface), switches, buttons, a pointing device, and other operators may be used as the operation input unit 107.

It should be noted that the electronic apparatus 101 is not limited to an apparatus designed for use in a specific field insofar as it can display an image or video generated inside or input from the outside.

Figure 26:
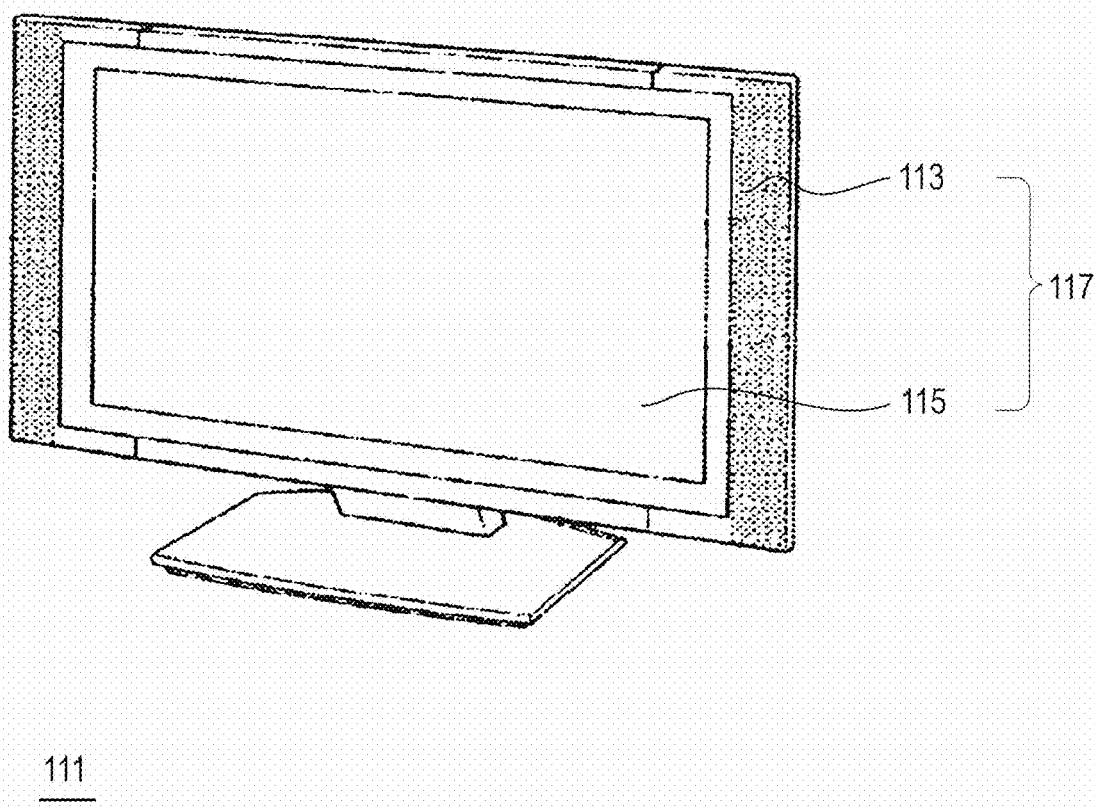
FIG. 26 is a diagram showing an appearance example of an electronic apparatus.

FIG. 26 shows an appearance example of a television receiver as an electronic apparatus. A television receiver 111 has a display screen 117 on the front surface of its housing. The display screen 117 includes a front panel 113, a filter glass 115, and the like. The display screen 117 corresponds to the liquid crystal panel according to the embodiment.

Figure 27A:
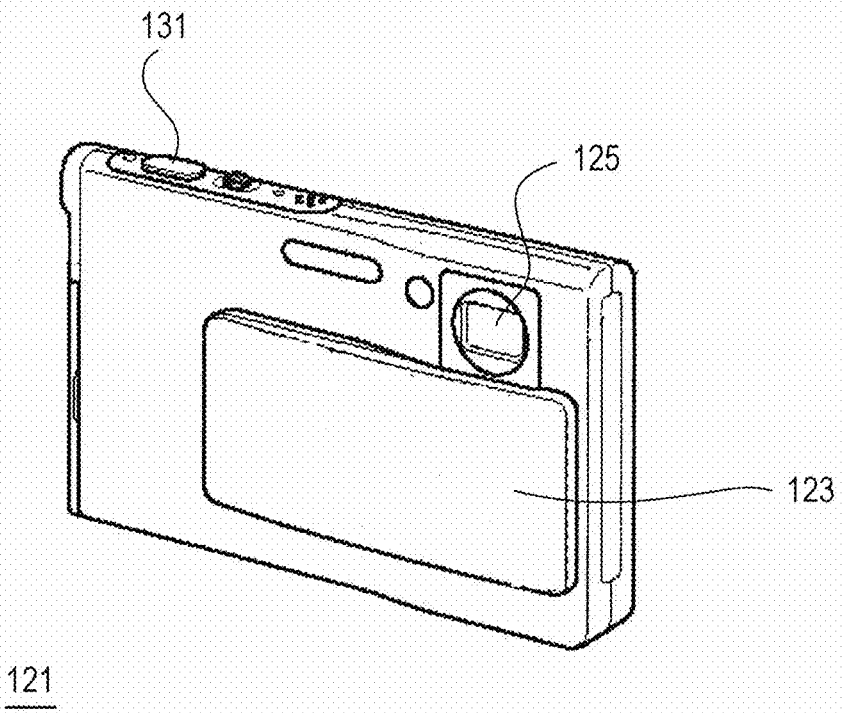
FIGS. 27A and 27B are diagrams showing an appearance example of an electronic apparatus.
Figure 27B:
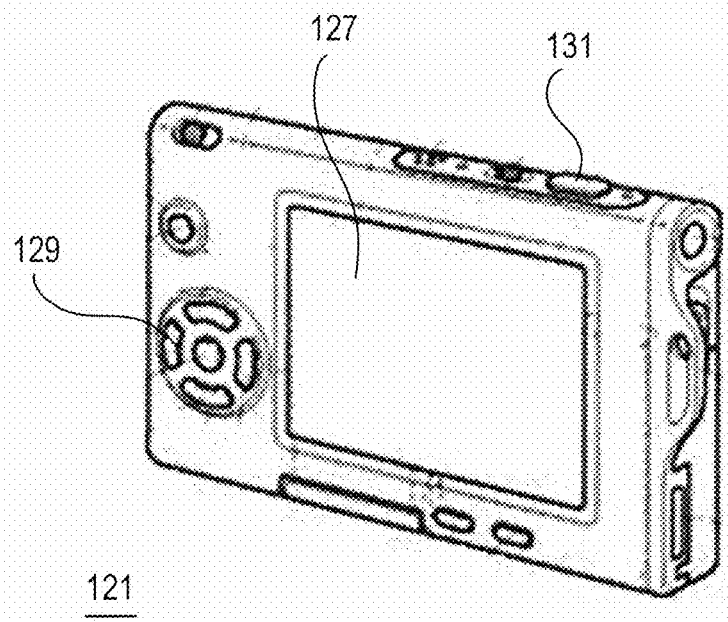

The electronic apparatus 101 may be, for example, a digital camera. FIGS. 27A and 27B show an appearance example of a digital camera 121. FIG. 27A shows an appearance example as viewed from the front (from the subject), and FIG. 27B shows an appearance example when viewed from the rear (from the photographer).

The digital camera 121 includes a protective cover 123, an imaging lens section 125, a display screen 127, a control switch 129, and a shutter button 131. Of these, the display screen 127 corresponds to the liquid crystal panel according to the embodiment.

Figure 28:
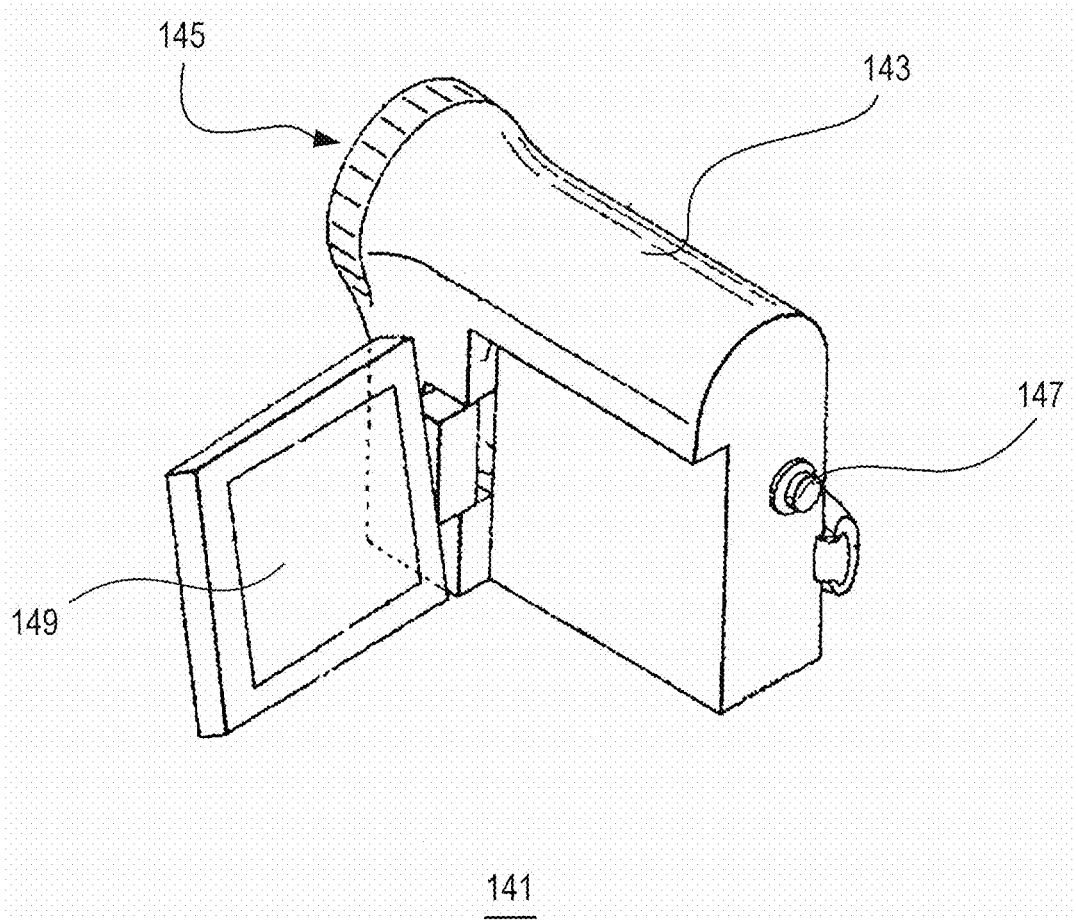
FIG. 28 is a diagram showing an appearance example of an electronic apparatus.

The electronic apparatus 101 may be, for example, a video camcorder. FIG. 28 shows an appearance example of a video camcorder 141.

The video camcorder 141 includes an imaging lens 145 provided to the front of a main body 143 so as to capture the image of the subject, an photographing start/stop switch 147, and a display screen 149. Of these, the display screen 149 corresponds to the liquid crystal panel according to the embodiment.

Figure 29A:
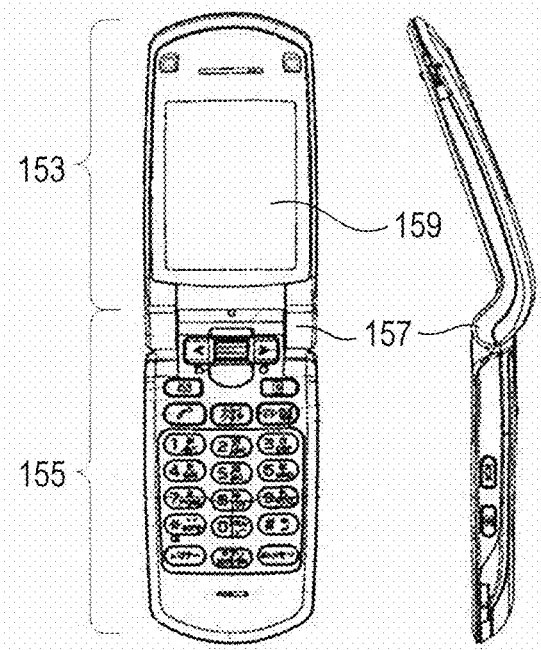
FIGS. 29A and 29B are diagrams showing an appearance example of an electronic apparatus.
Figure 29B:
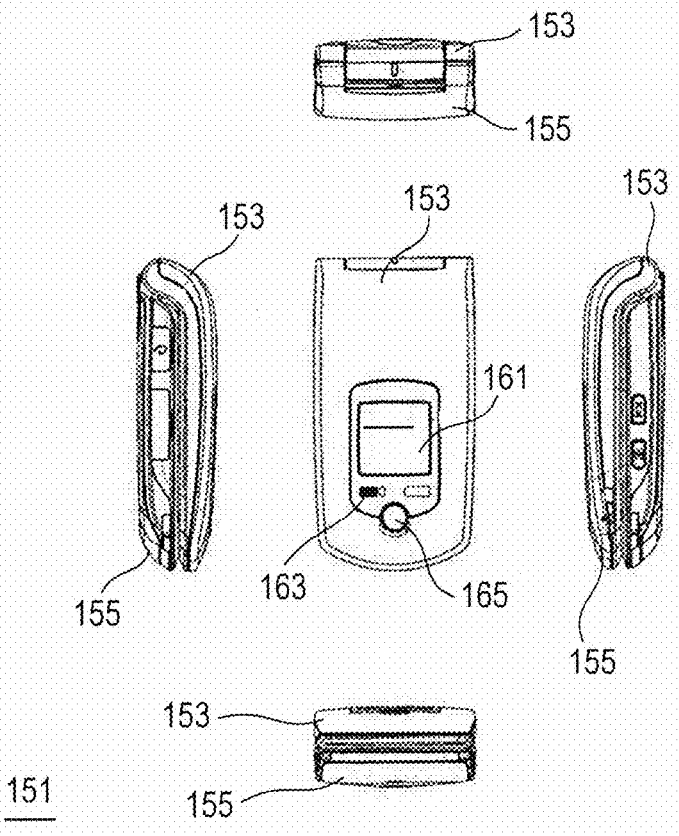

The electronic apparatus 101 may be, for example, a personal digital assistant. FIGS. 29A and 29B show an appearance example of a mobile phone 151 as a personal digital assistant. The mobile phone 151 shown in FIGS. 29A and 29B is a folder type mobile phone. FIG. 29A shows an appearance example of the mobile phone in an unfolded state, and FIG. 29B shows an appearance example of the mobile phone in a folded state.

The mobile phone 151 includes an upper housing 153, a lower housing 155, a connection portion (in this example, a hinge) 157, a display screen 159, an auxiliary display screen 161, a picture light 163, and an imaging lens 165. Of these, the display screen 159 and the auxiliary display screen 161 correspond to the liquid crystal panel according to the embodiment.

Figure 30:
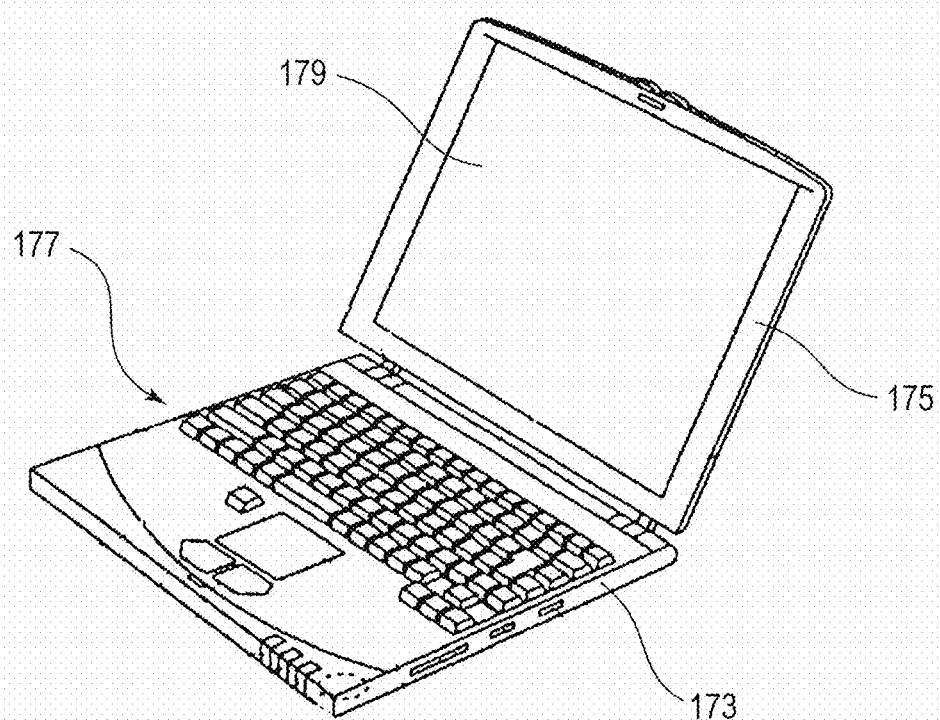
FIG. 30 is a diagram showing an appearance example of an electronic apparatus.

The electronic apparatus 101 may be, for example, a computer. FIG. 30 shows an appearance example of a notebook computer 171.

The notebook computer 171 includes a lower housing 173, an upper housing 175, a keyboard 177, and a display screen 179. Of these, the display screen 179 corresponds to the liquid crystal panel according to the embodiment.

In addition to the above-described electronic apparatuses, the electronic apparatus 101 may be, for example, a projector, an audio player, a game machine, an electronic book, an electronic dictionary, or the like.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:
1. A liquid crystal panel comprising:
a first substrate and a second substrate with a liquid crystal layer therebetween; and
a plurality of pixels arranged in a first direction and a second direction crossing the first direction, each of the pixels having a pixel region and including:
a first electrode;
a second electrode disposed between the first electrode and the first substrate; and
an alignment film having an alignment direction,
wherein the first electrode has:
a plurality of electrode branches each having a first end and a second end in the first direction;
a slit between adjacent two branches;

a first connection connecting the first ends of the electrode branches;

a second connection connecting the second ends of the electrode branches; and a contact hole disposed adjacent to the first connection, wherein the first electrode has areas including a first bent portion, a second bent portion, and a main portion that is disposed between the first bent portion and the second bent portion in a longitudinal direction of the first electrode, wherein the first bent portion is adjacent to the contact hole and includes the first end, the first bent portion being bent relative to the main portion along the first bending point line of the first electrode in such a manner that the first bent portion is bent at a first angle that is not less than 7 degrees and not more than 15 degrees with respect to the alignment direction, wherein the second bent portion is bent relative to the main portion along a second bending point line of the first electrode, in an area close to the second ends of the branches, wherein the second connection of the first electrode connects the second ends in the second bent portion, the second ends being adjacent to each other in the second direction, wherein a direction of the first bent portion is substantially parallel to a direction of the second bent portion, and wherein an area ratio of the first bent portion relative to an entire area of the pixel region is not more than 50%.

wherein an area ratio of the first bent portion relative to an entire area of the pixel region is not more than 50%.

2. The liquid crystal panel according to claim 1, wherein the first electrode and the second electrode are arranged on the first substrate.

3. The liquid crystal panel according to claim 1, wherein the first electrode and the second electrode are arranged in different layers.

4. The liquid crystal panel according to claim 1, wherein the first electrode and the second electrode are arranged in a same layer.

5. The liquid crystal panel according to claim 1, wherein the second bent portion is bent at a second angle that is not less than 7 degrees and not more than 15 degrees relative to the alignment direction of the liquid crystal layer.

6. The liquid crystal panel according to claim 1, further comprising:

a plurality of scanning lines and a plurality of signal lines surrounding each of the pixels, at least one second end of the first electrode in each of the pixels is overlapped by a corresponding scanning line.

7. The liquid crystal panel according to claim 1, further comprising:

a plurality of scanning lines and a plurality of signal lines surrounding each of the pixels, the main portions of the first electrodes are arranged in parallel with the signal lines.

8. The liquid crystal panel according to claim 7, wherein the first bent portions of the first electrodes are arranged not parallel with the signal lines.

9. The liquid crystal panel according to claim 1, wherein the branches and a plurality of the slits are arranged in both the main portion and the first bent portion, and wherein, in the main portion, the branches and the slits extend straight toward the first bent portion.

10. The liquid crystal panel according to claim 8, wherein the branches and a plurality of the slits are arranged in both the main portion and the first bent portion, and wherein, in the main portion, the branches and the slits extend straight toward the first bent portion.

11. The liquid crystal panel according to claim 1, wherein the first electrode is a pixel electrode, and the second electrode is a common electrode.

12. The liquid crystal panel according to claim 7, wherein the first electrode is a pixel electrode, and the second electrode is a common electrode.

13. The liquid crystal panel according to claim 8, wherein the first electrode is a pixel electrode, and the second electrode is a common electrode.

14. The liquid crystal panel according to claim 9, wherein the first electrode is a pixel electrode, and the second electrode is a common electrode.

15. The liquid crystal panel according to claim 1, wherein the first bent portion and the second bent portion are bent relative to the alignment direction such that:

the first bending point line is positioned, shifted relative to the first connection along the second direction; the second bending point line is positioned, shifted relative to the first folding line along the second direction; and the second connection is positioned, shifted relative to the second bending point line along the second direction.

* * * * *

UNITED STATES PATENT AND TRADEMARK OFFICE
CERTIFICATE OF CORRECTION

PATENT NO. : 11,029,567 B2  
APPLICATION NO. : 16/429639  
DATED : June 8, 2021  
INVENTOR(S) : Sakurai et al.

Page 1 of 1

It is certified that error appears in the above-identified patent and that said Letters Patent is hereby corrected as shown below:

In the Claims

Column 16, Line 67, replace "a slit between adjacent two branches" with "a slit between adjacent two electrode branches".

Column 17, Line 21, replace "branches" with "electrode branches".

Column 18, Line 14, replace "branches" with "electrode branches".

Column 18, Line 17, replace "branches" with "electrode branches".

Column 18, Line 20, replace "branches" with "electrode branches".

Column 18, Line 23, replace "branches" with "electrode branches".

Signed and Sealed this  
Third Day of August, 2021

Drew Hirshfeld  
*Performing the Functions and Duties of the*  
*Under Secretary of Commerce for Intellectual Property and*  
*Director of the United States Patent and Trademark Office*